(12) United States Patent
Miyasaka et al.

(10) Patent No.: US 10,175,923 B2
(45) Date of Patent: Jan. 8, 2019

(54) DISPLAY SYSTEM, DISPLAY DEVICE, INFORMATION DISPLAY METHOD, AND PROGRAM

(71) Applicant: SEIKO EPSON CORPORATION, Tokyo (JP)

(72) Inventors: Kazuhiko Miyasaka, Suwa (JP); Naoki Kobayashi, Matsumoto (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 294 days.

(21) Appl. No.: 14/963,962

(22) Filed: Dec. 9, 2015

(65) Prior Publication Data
US 2016/0188277 A1    Jun. 30, 2016

(30) Foreign Application Priority Data
Dec. 26, 2014   (JP) .................................. 2014-263853

(51) Int. Cl.
*G06F 3/14* (2006.01)
*G06F 3/01* (2006.01)
(Continued)

(52) U.S. Cl.
CPC ....... *G06F 3/1438* (2013.01); *G02B 27/0172* (2013.01); *G06F 3/012* (2013.01); *G06F 3/017* (2013.01); *G06F 3/0482* (2013.01); *G06F 3/0487* (2013.01); *G06F 3/1454* (2013.01); *G09G 3/002* (2013.01); *G09G 3/003* (2013.01); *G09G 5/14* (2013.01);
(Continued)

(58) Field of Classification Search
CPC ........ G06F 3/1438; G06F 3/012; G06F 3/017; G06F 3/0482; G06F 3/0487; G06F 3/1454; G02B 27/0172; G02B 2027/0132; G02B 2027/0138; G02B 2027/014; G09G 3/002; G09G 3/003; G09G 5/14
See application file for complete search history.

(56) References Cited

U.S. PATENT DOCUMENTS

| 2002/0049510 | A1 | 4/2002 | Oda et al. | |
| 2012/0249741 | A1* | 10/2012 | Maciocci | G06F 3/011 348/46 |
| 2013/0265437 | A1* | 10/2013 | Thorn | G06F 3/011 348/164 |

FOREIGN PATENT DOCUMENTS

| JP | 2002-132487 A | 5/2002 |
| JP | 2007-320715 A | 12/2007 |

(Continued)

*Primary Examiner* — Peter D McLoone
(74) *Attorney, Agent, or Firm* — Oliff PLC

(57) ABSTRACT

A display system includes one HMD and another HMD, and the one HMD includes an image display section adapted to display an image so that an outside view can visually be recognized, and an imaging section adapted to take an image of a range including at least a part of the outside view, which can visually be recognized in the image display section. Further, the one HMD includes a communication section, and a control section adapted to make the image display section display the image. The another HMD includes an image display section, a communication section, a display control section adapted to display the image based on the information received from the one HMD, an operation detection section, and a control section adapted to generate the guide information and transmit the guide information.

13 Claims, 12 Drawing Sheets

(51) Int. Cl.
*G06F 3/0482* (2013.01)
*G06F 3/0487* (2013.01)
*G02B 27/01* (2006.01)
*G09G 3/00* (2006.01)
*G09G 5/14* (2006.01)

(52) U.S. Cl.
CPC .......... *G02B 2027/014* (2013.01); *G02B 2027/0132* (2013.01); *G02B 2027/0138* (2013.01)

(56) References Cited

FOREIGN PATENT DOCUMENTS

| | | |
|---|---|---|
| JP | 2008-113317 A | 5/2008 |
| JP | 2012-138005 A | 7/2012 |
| JP | 2014-149718 A | 8/2014 |
| JP | 2014-229147 A | 12/2014 |

* cited by examiner

DISPLAY SYSTEM, DISPLAY DEVICE, INFORMATION DISPLAY METHOD, AND PROGRAM

BACKGROUND

1. Technical Field

The present invention relates to a display system, a display device, an information display method, and a program.

2. Related Art

In the past, there has been known an example of using a display device mounted on the head and called a head mounted display (HMD) in order to support a person performing a work (see, e.g., JP-A-2007-320715 (Document 1) and JP-A-2012-138005 (Document 2)). The system described in Document 1 transmits a view field image, which has been taken by a camera device provided to a worker HMD unit, to a manager HMD unit to make it possible to monitor the working state of the worker in the manager HMD unit. Further, the server described in Document 2 transmits information related to a destination, goods, schedule, and so on to an HMD worn by a pilot of a transport aircraft. A client device provided with the HMD displays virtual space information on the HMD based on the information transmitted from the server, position information and orientation information of the transport aircraft, and so on. The virtual space information includes a variety of types of information expressed by arrows or characters.

Although in the related art method, the view field image and the information using characters are displayed in the HMD on the side of supporting the work or on the side on which the work is supported as described above, it has been desired to transmit a larger amount of information in a way easier to understand.

SUMMARY

An advantage of some aspects of the invention is to make it possible to transmit a larger amount of information in a way easier to understand to a person wearing a head-mounted display device.

A display system according to an aspect of the invention includes a first display device of a head mounted type, and a second display device of the head mounted type, the first display device includes a first display section adapted to display an image so that an outside view can visually be recognized, an imaging section adapted to take an image of a range including at least a part of the outside view, which can visually be recognized in the first display section, a first communication section adapted to transmit guide target information generated based on a taken image of the imaging section to the second display device, and receive guide information from the second display device, and a first control section adapted to make the first display section display an image based on the guide information received in the first communication section, and the second display device includes a second display section adapted to display an image so that the outside view can visually be recognized, a second communication section adapted to receive the guide target information from the first display device, and transmit the guide information to the first display device, a display control section adapted to make the second display section display an image based on the guide target information received by the second communication section, an operation detection section adapted to detect an operation, and a second control section adapted to generate the guide information including information representing an operation detected by the operation detection section during a period of displaying an image based on the guide target information, information adapted to associate an operation and the guide target information with each other, and transmit the guide information using the second communication section.

According to the aspect of the invention, the guide target information based on the taken image taken by the first display device is transmitted to the second display device, the second display device displays the image based on the guide target information, and the guide information including the information for associating the operation during the period of displaying the image and the guide target information with each other is transmitted to the first display device. Therefore, since the information related to the operation associated with the taken image in the first display device can be provided to the first display device using the operation of the second display device, it is possible to transmit a large amount of information to the user of the first display device in an easy-to-understand manner.

According to another aspect of the invention, in the display system described above, the first control section provided to the first display device generates the guide target information including the taken image of the imaging section, the operation detection section provided to the second display device detects a position pointing operation, and the second control section generates the guide information including information adapted to associate a pointing position of the position pointing operation detected by the operation detection section with the taken image included in the guide target information.

According to this aspect of the invention, the position pointing operation can be performed in the second display device, and in the first display device, it is possible to make the pointing position of the position pointing operation in the second display device correspond to the taken image. Therefore, it is possible to transmit the content of the position pointing operation performed in the second display device to the user of the first display device.

According to another aspect of the invention, in the display system described above, the second control section provided to the second display device generates the guide information including information related to the pointing position of the position pointing operation detected by the operation detection section, and an image of a pointing object, and the first control section provided to the first display device makes the first display section display the image of the pointing object at a position corresponding to the pointing position included in the guide information received by the first communication section.

According to this aspect of the invention, by performing the position pointing operation in the second display device, the first display device displays the image of the pointing object in accordance with the pointing position by the position pointing operation. Therefore, due to the operation of the second display device, it is possible to point the position to the user of the first display device.

According to another aspect of the invention, in the display system described above, the first control section provided to the first display device makes the first display section display an image for a GUI (graphical user interface) operation, and detects an operation based on the display position of the image for the GUI operation and the pointing position included in the guide information received by the second communication section.

According to this aspect of the invention, by performing the position pointing operation in the second display device, it is possible to perform the GUI operation to the first display device to control the first display device.

According to another aspect of the invention, in the display system described above, the first control section provided to the first display device detects an operation to the first display device based on information representing an operation included in the guide information received by the first communication section.

According to this aspect of the invention, by performing the operation in the second display device, it is possible to control the first display device.

According to another aspect of the invention, in the display system described above, in a case in which the guide target information received by the second communication section includes the taken image, the second control section provided to the second display device makes the second display section display the taken image, edits the taken image based on the operation detected by the operation detection section during a period of displaying the taken image, and generates the guide information including the taken image edited.

According to this aspect of the invention, it is possible to edit the taken image taken in the first display device to show the result to the user of the first display device.

According to another aspect of the invention, in the display system described above, the second display device transmits information adapted to designate imaging condition of the imaging section provided to the first display device using the second communication section, and the first control section of the first display device receives the imaging condition from the second display device, controls the imaging section based on the imaging condition received, and transmits the guide target information generated based on the taken image of the imaging section to the second display device.

According to this aspect of the invention, by designating the imaging condition from the second display device, the guide target information based on the taken image taken in the imaging condition thus designated can be obtained in the second display device. Therefore, the user of the second display device can obtain the desired information in the environment of the first display device.

According to another aspect of the invention, in the display system described above, the second display device transmits information adapted to designate one of an imaging direction, a zoom factor, and the imaging direction and the zoom factor as the imaging condition using the second communication section, and the first control section of the first display device controls one of the imaging direction, the zoom factor, and the imaging direction and the zoom factor based on the imaging condition received from the second display device.

According to this aspect of the invention, by designating the imaging direction or the zoom factor from the second display device, the guide target information based on the taken image taken in the imaging condition thus designated can be obtained in the second display device. Therefore, the user of the second display device can obtain the information related to the desired taken image in the environment of the first display device.

A head mounted display according to still another aspect of the invention includes a display section adapted to display an image so that an outside view can visually be recognized, an imaging section adapted to take an image of a range including at least a part of the outside view, which can visually be recognized in the display section, a communication section adapted to transmit guide target information generated based on a taken image of the imaging section to an external device, and receive guide information from the external device, and a control section adapted to calculate a display position of an image based on the guide information received by the communication section, and make the display section display an image based on the guide information at a display position calculated.

According to this aspect of the invention, the guide target information based on the taken image in a range including a part of the outside view is transmitted to the external device, and the image is displayed in accordance with the guide information received from the external device. Thus, it is possible to transmit the information related to the operation presently performed to the external device, and to efficiently show the information transmitted by the external device to the user.

An information display method according to yet another aspect of the invention includes providing a first display device including a first display section adapted to display an image so that an outside view can visually be recognized, and a second display device including a second display section adapted to display an image so that an outside view can visually be recognized, imaging a range including at least a part of the outside view which can visually be recognized in the first display section using the first display device, and transmitting guide target information generated based on the taken image to the second display device, receiving the guide target information from the first display device using the second display device, making the second display section display the image based on the guide target information received, detecting an operation during a period of displaying the image based on the guide target information, generating guide information including information representing the operation detected, and information adapted to associate the detected operation and the guide target information with each other, and transmitting the guide information using the second communication section, and receiving the guide information transmitted by the second display device using the first display device, and making the first display section display the image based on the guide information received.

According to this aspect of the invention, the guide target information based on the taken image taken by the first display device is transmitted to the second display device, the second display device displays the image based on the guide target information, and the guide information including the information for associating the operation during the period of displaying the image and the guide target information with each other is transmitted to the first display device. Therefore, since the information related to the operation associated with the taken image in the first display device can be provided to the first display device using the operation of the second display device, it is possible to transmit a large amount of information to the user of the first display device in an easy-to-understand manner.

A program according to still yet another aspect of the invention is executed by a computer adapted to control a head mounted display provided with a display section adapted to display an image so that an outside view can visually be recognized and an imaging section adapted to take an image of a range including at least a part of the outside view which can visually be recognized in the display section, the program including transmitting guide target information generated based on a taken image of the imaging section to an external device using the computer, receiving guide information from the external device, calculating a display position of the image based on the guide information received, making the display section display the image based on the guide information at a display position calculated.

According to this aspect of the invention, the guide target information based on the taken image in a range including a part of the outside view is transmitted to the external device, and the image is displayed in accordance with the guide information received from the external device using a display device. Therefore, it is possible to transmit the information related to the operation presently performed to the external device, and to efficiently show the information transmitted by the external device to the user.

As further another aspect of the invention, the invention can be configured as a computer readable recording medium storing the program.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
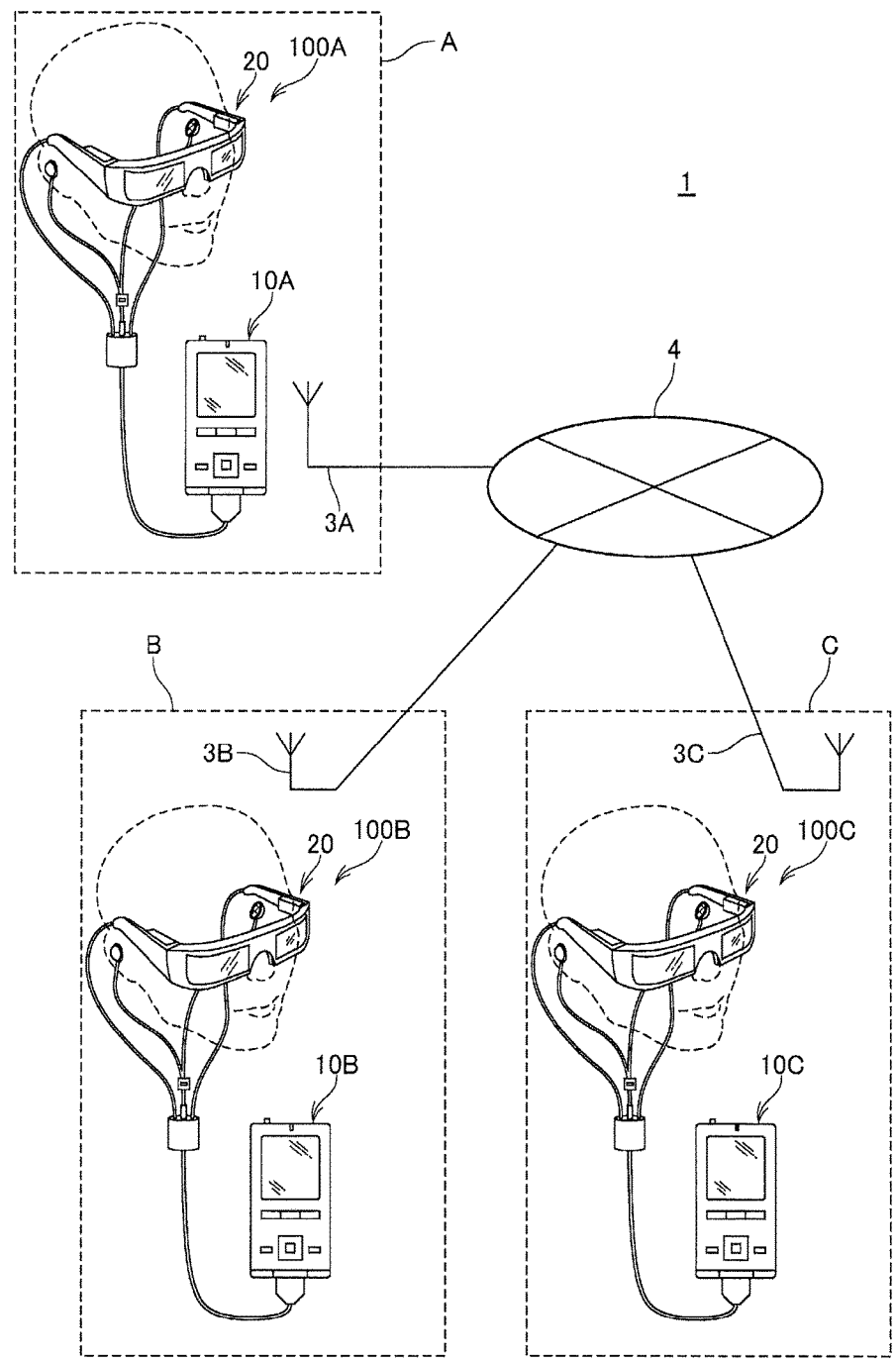
FIG. 1 is a general configuration diagram of a display system according to a first embodiment of the invention.

FIG. 1 is a schematic configuration diagram of a display system 1 according to an embodiment to which the invention is applied.

As shown in FIG. 1, the display system 1 is a system obtained by connecting a plurality of HMD 100 to each other via a communication network 4 so as to be able to communicate with each other. Although FIG. 1 shows an example of connecting the three HMD 100 to the communication network 4, the number of the HMD 100 provided to the display system 1 is not particularly limited.

In the present embodiment, the display system 1 is provided with two types of HMD 100 having respective functions different from each other, and the two types of HMD 100 are respectively referred to as HMD 100A and HMD 100B. In the case in which it is not necessary to separate HMD 100A and HMD 100B from each other, the description of HMD 100 is used.

The HMD 100A, 100B are each a display device worn by the user on the head as shown in FIG. 1, and are also called a head mounted display. The HMD 100A, 100B are each an optical transmissive HMD allowing the user to visually recognize a virtual image and at the same time visually recognize an external sight directly.

It should be noted that in the following explanation, the virtual image to be visually recognized by the user using the HMD 100A, 100B is also referred to as a "display image" for the sake of convenience. Further, emission of the image light generated based on image data is also referred to as "display of the image."

In the display system 1, a worker performing a work wears the HMD 100B, a commander for making an instruction to or performing management of the worker wears the HMD 100A, and information for the instruction and the management is transmitted and received between the commander and the worker. There is no geographical constraint between a command site A where the commander is located and a working site B where the worker performs the work providing the connection to the communication network 4 is available, and the command site A and the working site B can be distant from each other, or can also be close to each other.

In the display system 1, the HMD 100B worn by the worker has a function of taking an image of the view field of the worker and then transmitting the work information (guide object information) including the taken image to the HMD 100A. The HMD 100A receives the work information, and then displays the taken image of the view field of the worker. The commander operates the HMD 100A to perform a selection of an explanatory content, an action of moving a pointing object (e.g., an arm, a hand, or a finger) for an explanation, and so on, and thus, instruction information (guide information) including the data representing the content thus selected and the movement of the pointing object is transmitted from the HMD 100A to the HMD 100B. The HMD 100A is a so-called see-through display device with which the outside view can visually be recognized. Therefore, the commander performs the operation while observing the view field of the worker displayed by the HMD 100A.

The HMD 100B receives the instruction information transmitted by the HMD 100A to display the image of the content and the image showing the motion of the pointing object on an image display section 20. Since the HMD 100B is a see-through display device, it is possible for the worker to perform a work looking at the hands while viewing the image displayed by the image display section 20.

Thus, in the display system 1, it is possible for the commander located in the command site A to visually recognize the view field of the worker performing a work in the working site B, and then provide a guide and an explanation of the work to the HMD 100B of the worker using the pointing object and the content. It is possible for the worker to perform the work while watching the image of the content and the motion of the pointing object.

The communication network 4 is realized by a variety of types of communication lines such as a public line network, a dedicated line, a wireless communication line including a mobile phone line, and backbone communication lines of these lines, or a combination of any of these lines, and the specific configuration thereof is not particularly limited. The communication network 4 can be a wide area communication line network capable of connecting remote locations to each other, or can also be a local area network (LAN) set in a specific facility or building. Further, the communication network 4 can also include network equipment such as server devices, gateway devices, and router devices for connecting the variety of types of communication lines described above to each other. Further, the communication network 4 can also be formed of a plurality of communication lines. In the command site A, there is disposed an access point 3A for providing connection to the communication network 4, and in the working site B, there is disposed an access point 3B for providing connection to the communication network 4. The wireless access points 3A, 3B are each a communication device such as an access point or a router, and relay the data communication between the HMD 100A, 100B and the communication network 4, respectively.

The HMD 100A executes data communication with other HMD 100B via the wireless access points 3. It should be noted that it is also possible for each of the HMD 100A to execute the wireless communication with other HMD 100B directly in, for example, an ad hoc mode, or it is also possible to connect the HMD 100A, 100B to each other using a wired communication line. In other words, the configuration of the display system 1 is not particularly limited providing the HMD 100A and the HMD 100B are capable of communicating with each other.

The HMD 100A is provided with an image display section 20 worn by the commander as a user on the head, and a control device 10A for controlling the image display section 20. The image display section 20 allows the user to visually recognize a virtual image in a state of being worn on the head of the user. The control device 10A also functions as a controller for the user to operate the HMD 100A.

Further, the HMD 100B is provided with the image display section 20 and a control device 10B. The image display section 20 is common to the HMD 100A, 100B, and allows the user to visually recognize a virtual image in a state of being worn on the head of the user. The control device 10B controls the image display section 20 similarly to the control device 10A, and also functions as a controller for the user to operate the HMD 100B. The control device 10A and the control device 10B have a common exterior appearance, but differ in a functional configuration from each other. The difference will be described later.

Figure 2:
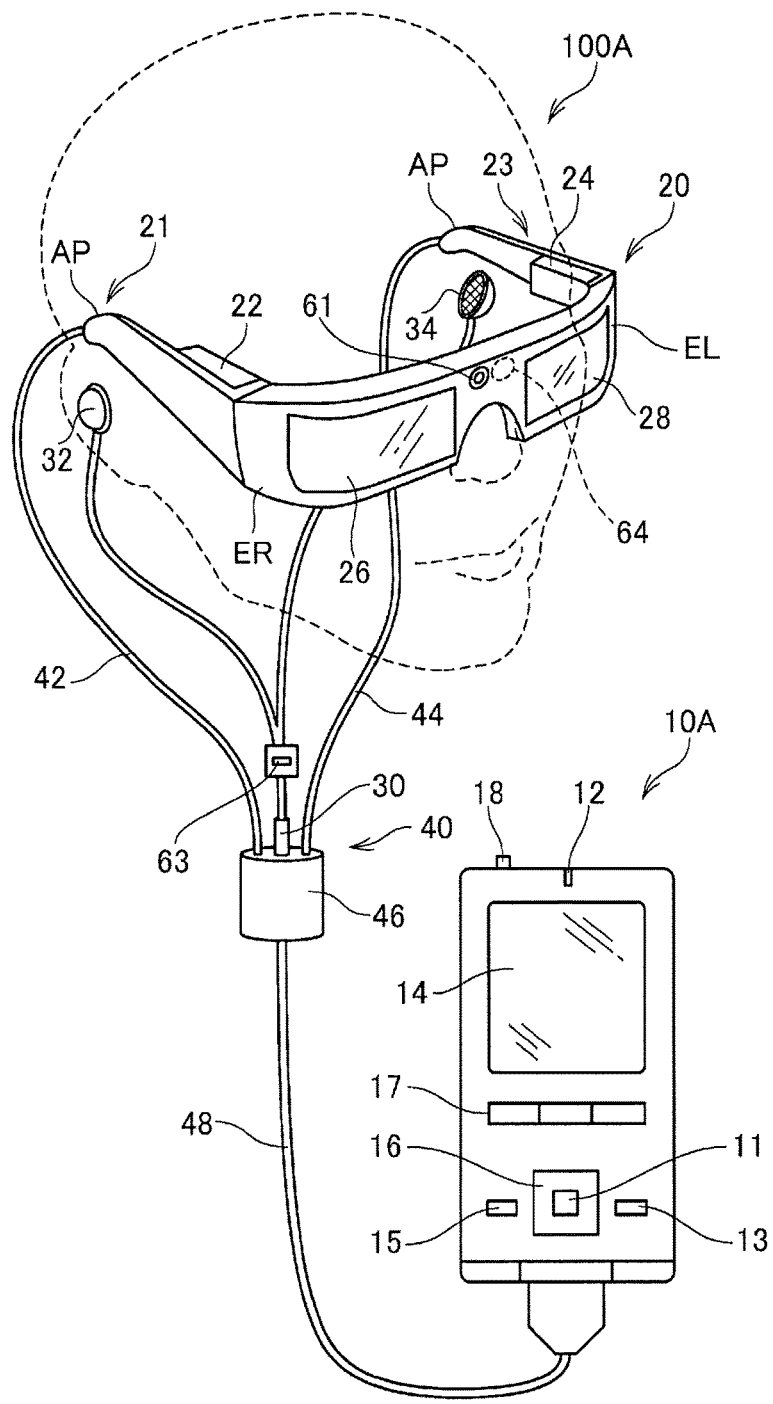
FIG. 2 is an explanatory diagram showing an exterior configuration of a head mounted display.

FIG. 2 is an explanatory diagram showing an exterior configuration of the HMD 100A. Since the HMD 100B is the same in the exterior appearance as the HMD 100A, the graphical description and the explanation of the configuration of the HMD 100B will be omitted.

The image display section 20 is a mount body to be mounted on the head of the user, and has a shape of a pair of glasses in the present embodiment. The image display section 20 is provided with a right holding section 21, a right display drive section 22, a left holding section 23, a left display drive section 24, a right optical image display section 26, a left optical image display section 28, a camera 61, and a microphone 63. The right optical image display section 26 and the left optical image display section 28 are disposed so as to be located in front of the right and left eyes of the user, respectively, when the user wears the image display section 20. One end of the right optical image display section 26 and one end of the left optical image display section 28 are connected to each other at a position corresponding to the glabella of the user when the user wears the image display section 20.

The right holding section 21 is a member disposed so as to extend from an end portion ER, which is the other end of the right optical image display section 26, to a temporal region of the head of the user when the user wears the image display section 20. Similarly, the left holding section 23 is a member disposed so as to extend from an end portion EL, which is the other end of the left optical image display section 28, to a temporal region of the head of the user when the user wears the image display section 20. The right holding section 21 and the left holding section 23 hold the image display section 20 on the head of the user in such a manner as the temples of the pair of glasses.

The right display drive section 22 and the left display drive section 24 are disposed on the sides to be opposed to the head of the user when the user wears the image display section 20. It should be noted that the right display drive section 22 and the left display drive section 24 are also collectively referred to simply as a "display drive section," and the right optical image display section 26 and the left optical image display section 28 are also collectively referred to simply as an "optical image display section."

The display drive sections 22, 24 respectively include liquid crystal displays 241, 242 (hereinafter also referred to as "LCD 241, 242"), projection optical systems 251, 252, and so on (see FIG. 4). The details of the configuration of the display drive sections 22, 24 will be described later. The optical image display sections 26, 28 as optical members are respectively provided with light guide plates 261, 262 (see FIG. 4), and dimming plates 20A. The light guide plates 261, 262 are each formed of light transmissive resin or the like, and guide the image light output from the display drive sections 22, 24 to the eyes of the user, respectively. Each of the dimming plates 20A is a thin-plate like optical element, and is disposed so as to cover the obverse side of the image display section 20, which is the side opposite to the side of the eyes of the user. As the dimming plates 20A, there are used a variety of members such as a member with nearly zero light permeability, a nearly transparent member, a member for transmitting light while reducing the light intensity, or a member for attenuating or reflecting the light with a specific wavelength. By appropriately selecting the optical characteristics (e.g., the light transmittance) of the dimming plates 20A, it is possible to control the intensity of the outside light externally entering the right optical image display section 26 and the left optical image display section 28 to thereby control easiness of the visual recognition of the virtual image. In the description of the present embodiment, there is explained the case of using the dimming plates 20A having at least such light transmittance that the user wearing the HMD 100 can visually recognize the outside scenery. The dimming plates 20A protect the right light guide plate 261 and the left light guide plate 262 to suppress damages, adhesion of dirt, and so on to the right light guide plate 261 and the left light guide plate 262, respectively.

The dimming plates 20A can be arranged to be detachably attached to the right optical image display section 26 and the left optical image display section 28, or it is possible to arrange that a plurality of types of dimming plates 20A can be attached while being replaced with each other, or it is also possible to eliminate the dimming plates 20A.

The camera 61 is disposed in a boundary portion between the right optical image display section 26 and the left optical image display section 28. In the state in which the user wears the image display section 20, the position of the camera 61 is roughly the middle of the both eyes of the user in a horizontal direction, and is above the both eyes of the user in the vertical direction. The camera 61 is a digital camera provided with an imaging element such as CCD or CMOS, an imaging lens, and so on, and can also be a monocular camera or a stereo camera.

The camera 61 takes an image of at least a part of the outside view in the obverse side direction of the HMD 100, in other words, in the view field direction of the user in the state of wearing the HMD 100A. Although the width of the field angle of the camera 61 can arbitrarily be set, it is preferable that the imaging range of the camera 61 corresponds to the range including the external sight visually recognized by the user through the right optical image display section 26 and the left optical image display section 28. Further, it is more preferable that the imaging range of the camera 61 is set so that the image of the entire view field of the user through the dimming plates 20A can be taken. The camera 61 takes the image in accordance with the control by the control section 140, and then outputs the taken image data to the control section 140.

Figure 3:
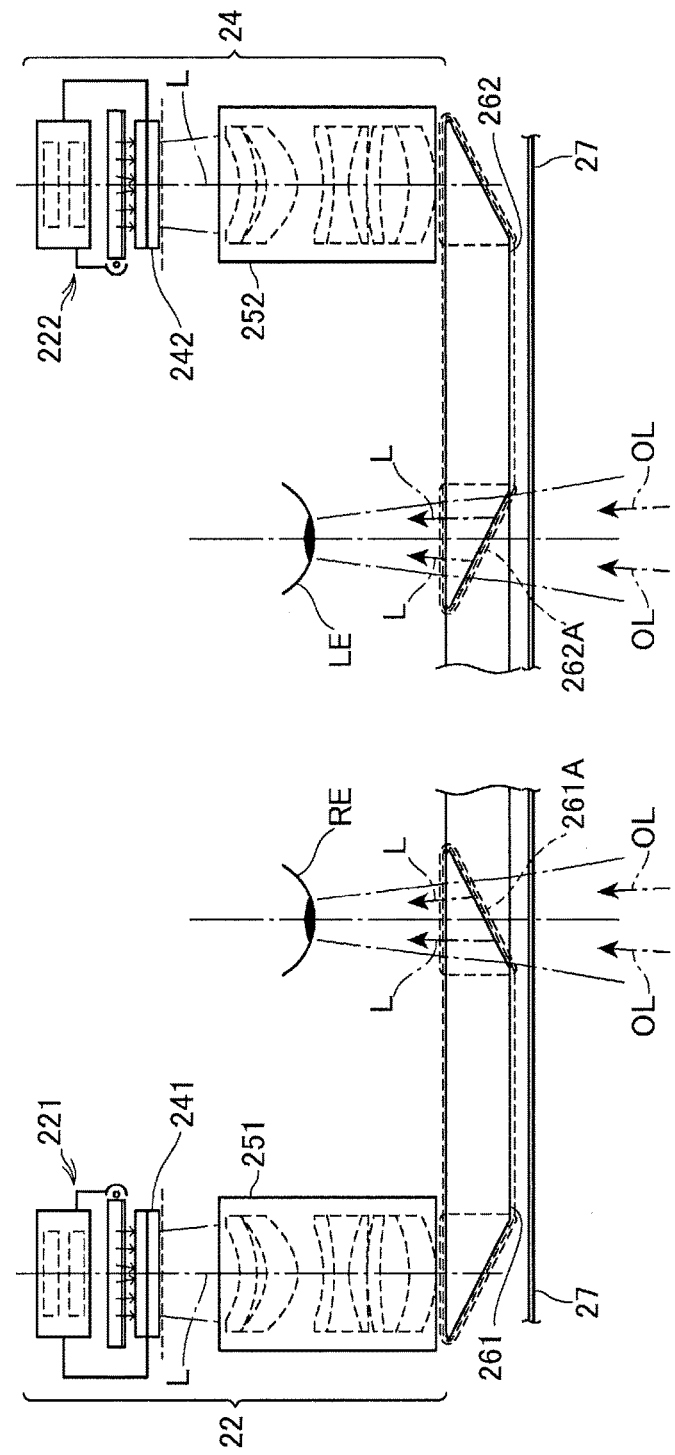
FIG. 3 is a diagram showing a configuration of an optical system of an image display section.

FIG. 3 is a plan view of a substantial part showing a configuration of an optical system provided to the image display section 20. FIG. 3 shows the left eye LE and the right eye RE of the user for the sake of explanation.

The left display drive section 24 is provided with a left backlight 222 having a light source such as LED and a diffusion plate, a left LCD 242 of a transmissive type disposed on the light path of the light emitted from the diffusion plate of the left backlight 222, and a left projection optical system 252 including a lens group for guiding the image light L having passed through the left LCD 242 and so on. The left LCD 242 is a transmissive liquid crystal panel having a plurality of pixels arranged in a matrix.

The left projection optical system 252 includes a collimating lens for converting the image light L having been emitted from the left LCD 242 into a light beam in a parallel state. The image light L converted by the collimating lens into the light beam in the parallel state enters the left light guide plate 262. The left light guide plate 262 is a prism provided with a plurality of reflecting surfaces for reflecting the image light L, and the image light L is guided to the left eye LE through a plurality of times of reflection inside the left light guide plate 262. The left light guide plate 262 is provided with a half mirror 262A (a reflecting surface) located in front of the left eye LE.

The image light L having been reflected by the half mirror 262A is emitted from the left optical image display section 28 toward the left eye LE, and then the image light L forms an image on the retina of the left eye LE to make the user visually recognize the image.

The right display drive section 22 is formed so as to be bilaterally symmetric with the left display drive section 24. The right display drive section 22 is provided with a right backlight 221 having a light source such as LED and a diffusion plate, a right LCD 241 of a transmissive type disposed on the light path of the light emitted from the diffusion plate of the right backlight 221, and a right projection optical system 251 including a lens group for guiding the image light L having passed through the right LCD 241 and so on. The right LCD 241 is a transmissive liquid crystal panel having a plurality of pixels arranged in a matrix.

The right projection optical system 251 includes a collimating lens for converting the image light L having been emitted from the right LCD 241 into a light beam in a parallel state. The image light L converted by the collimating lens into the light beam in the parallel state enters the right light guide plate 261. The right light guide plate 261 is a prism provided with a plurality of reflecting surfaces for reflecting the image light L, and the image light L is guided to the right eye RE through a plurality of times of reflection inside the right light guide plate 261. The right light guide plate 261 is provided with a half mirror 261A (a reflecting surface) located in front of the right eye RE.

The image light L having been reflected by the half mirror 261A is emitted from the right optical image display section 26 toward the right eye RE, and then the image light L forms an image on the retina of the right eye RE to make the user visually recognize the image.

The image light L having been reflected by the half mirror 261A and outside light OL having passed through the dimming plate 20A enter the right eye RE of the user. The image light L having been reflected by the half mirror 262A and the outside light OL having passed through the dimming plate 20A enter the left eye LE. As described above, the HMD 100 makes the image light L having been processed inside and the outside light OL overlap each other and then enter the eyes of the user, and it is possible for the user to see the outside view through the dimming plate 20A, and to visually recognize the image due to the image light L so as to be superimposed on the outside view. As described above, the HMD 100 functions as a see-through display device.

It should be noted that the left projection optical system 252 and the left light guide plate 262 are also collectively referred to as a "left light guide section," and the right projection optical system 251 and the right light guide plate 261 are also collectively referred to as a "right light guide section." The configuration of the right light guide section and the left light guide section is not limited to the example described above, but an arbitrary method can be used as long as the virtual image is formed in front of the eyes of the user using the image light, and for example, it is also possible to use a diffraction grating, or to use a semi-transmissive reflecting film.

The image display section 20 is connected to the control device 10A via a connection section 40. The connection section 40 is provided with a main body cord 48 to be connected to the control device 10A, a right cord 42, a left cord 44, and a coupling member 46. The main body cord 48 is branched into two cords to form the right cord 42 and the left cord 44. The right cord 42 is inserted into the housing of the right holding section 21 from a tip portion AP in the extending direction of the right holding section 21, and is connected to the right display drive section 22. Similarly, the left cord 44 is inserted into the housing of the left holding section 23 from a tip portion AP in the extending direction of the left holding section 23, and is connected to the left display drive section 24.

The coupling member 46 is disposed at a branch point of the main body cord 48, and the right cord 42 and the left cord 44, and has a jack to which an earphone plug 30 is connected. A right earphone 32 and a left earphone 34 extend from the earphone plug 30. A microphone 63 is disposed in the vicinity of the earphone plug 30. The wiring from the earphone plug 30 to the microphone 63 is bundled as a single cord, and the cord is branched at the microphone 63 to be connected respectively to the right earphone 32 and the left earphone 34.

Figure 4:
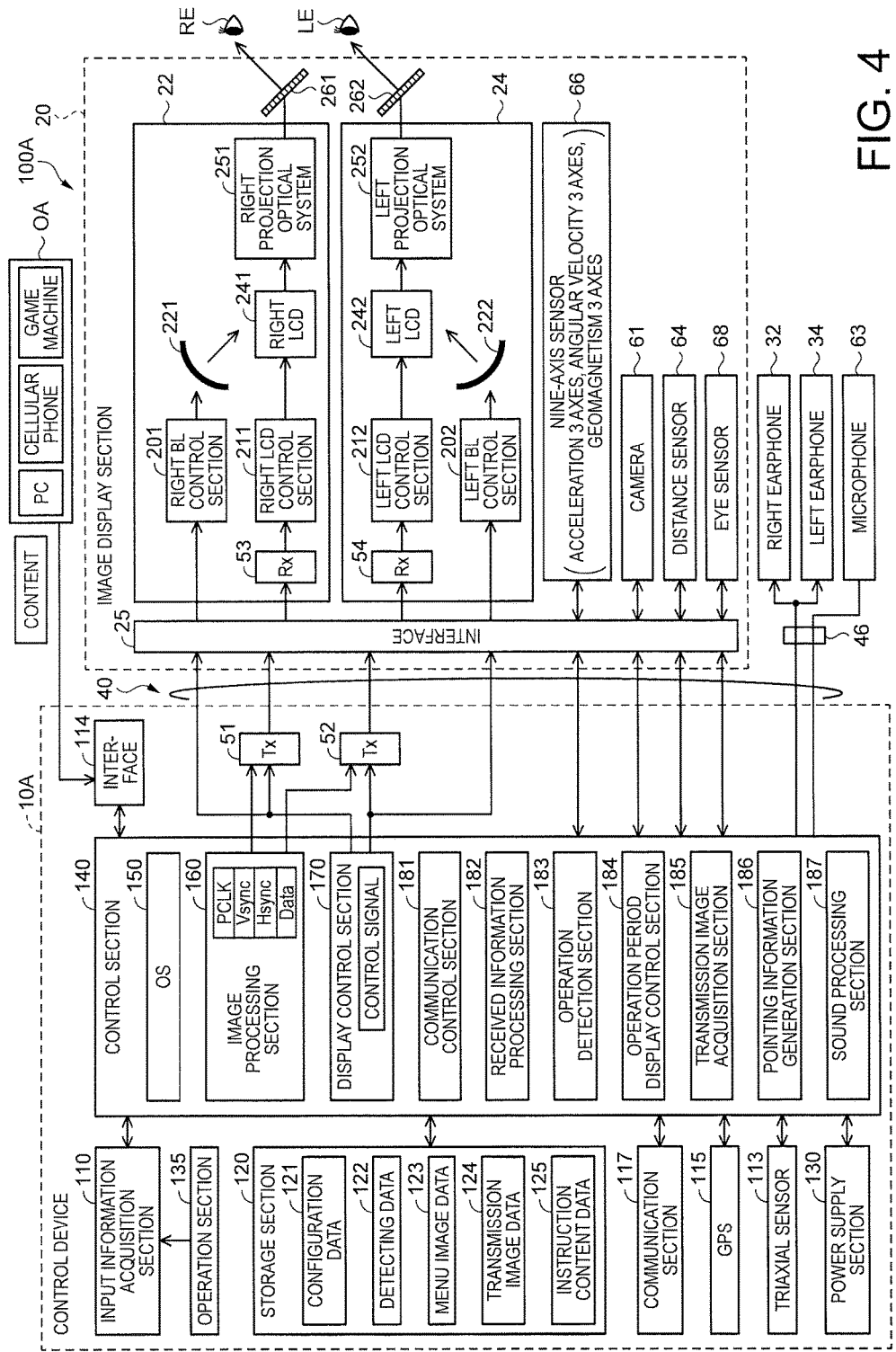
FIG. 4 is a functional block diagram of components constituting the head mounted display in a command site.

As shown in, for example, FIG. 1, the microphone 63 is disposed so that a sound collection section of the microphone 63 faces to the eye direction of the user, and collects the sound to output a sound signal to a sound processing section 187 (FIG. 4). The microphone 63 can be, for example, a monaural microphone or a stereo microphone, or can also be a directional microphone, or an omnidirectional microphone.

The right cord 42, the left cord 44, and the main body cord 48 are only required to be capable of transmitting digital data, and each can be formed of, for example, a metal cable or an optical fiber. Further, it is also possible to adopt a configuration of bundling the right cord 42 and the left cord 44 into a single cord.

The image display section 20 and the control device 10A transmit a variety of signals via the connection section 40. There are provided connecters (not shown) to be fitted with each other respectively to an end portion of the main body cord 48 on the opposite side to the coupling member 46, and the control device 10A. By fitting the connector of the main body cord 48 and the connector of the control device 10A to each other, or releasing the fitting, it is possible to connect or disconnect the control device 10A and the image display section 20 to or from each other.

The control device 10A controls the HMD 100. The control device 10A is provided with switches including a determination key 11, a lighting section 12, a display switching key 13, a luminance switching key 15, arrow keys 16, a menu key 17, and a power switch 18. Further, the control device 10A is provided with a track pad 14 operated by the user with the hand and the fingers.

The determination key 11 detects a holding-down operation, and then outputs a signal for determining the content of the operation in the control device 10A. The lighting section 12 is provided with a light source such as light emitting diodes (LED) to make a notification of the operation state (e.g., an ON/OFF state of the power) of the HMD 100. The display switching key 13 outputs, for example, a signal for instructing switching of the display mode of the image in accordance with a holding-down operation.

The track pad 14 has an operation surface for detecting a touch operation, and outputs an operation signal in accordance with the operation to the operation surface. The detection method in the operation surface is not particularly limited, but there can be adopted an electrostatic method, a pressure detection method, an optical method, and so on. The luminance switching key 15 outputs a signal for instructing an increase or a decrease of the luminance of the image display section 20 in accordance with a holding-down operation. The arrow keys 16 outputs an operation signal in accordance with a holding-down operation to the keys corresponding to up, down, right, and left directions. The power switch 18 is a switch for switching between ON and OFF of the power of the HMD 100.

Regarding the content explained with reference to FIG. 2, the configuration is common to the HMD 100B and the HMD 100A. In other words, the configuration of the HMD 100B is obtained by replacing the control device 10A with the control device 10B in the above explanation of the configuration.

Figure 5:
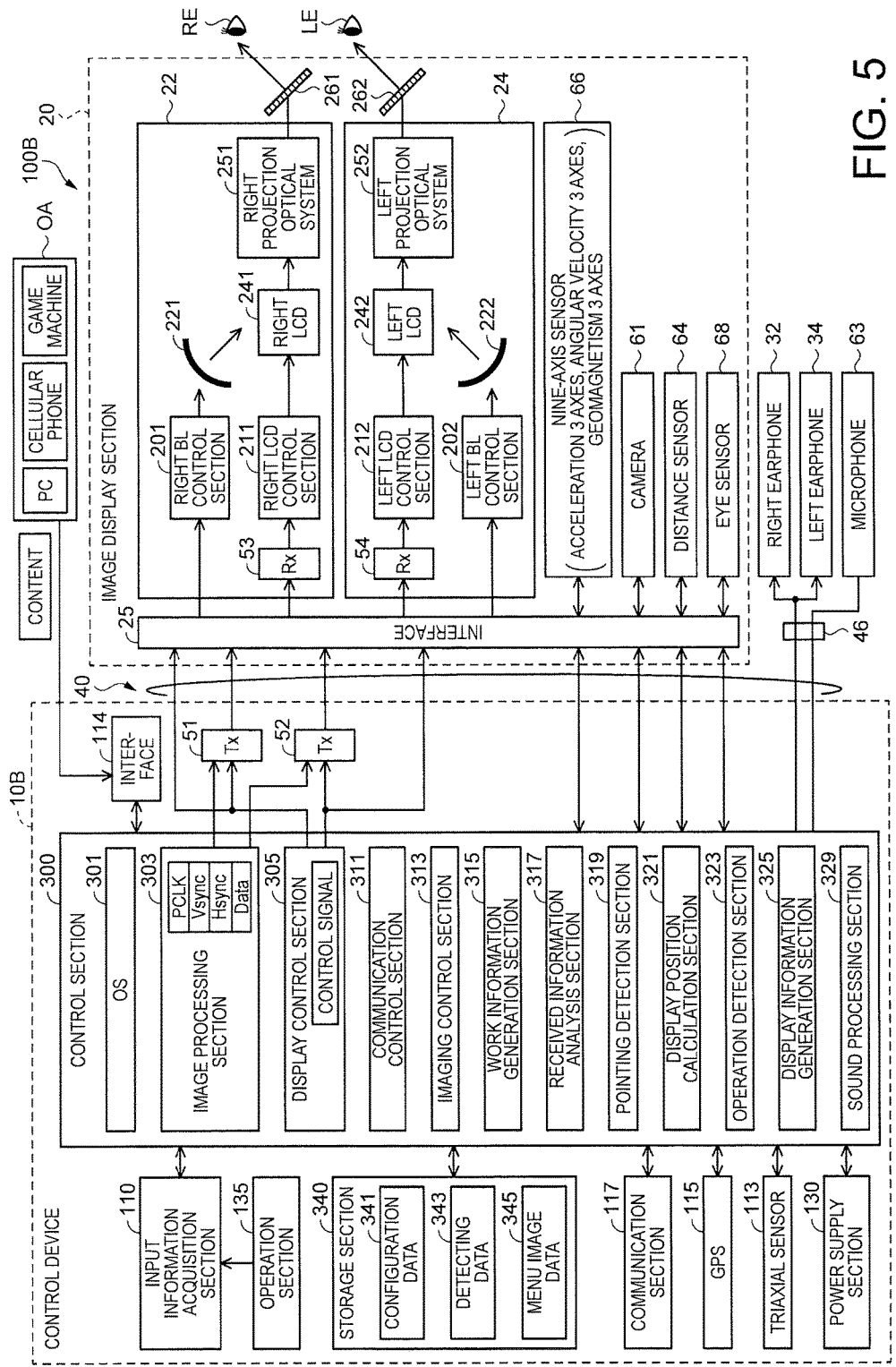
FIG. 5 is a functional block diagram of components constituting the head mounted display in a working site.

FIG. 4 is a functional block diagram of the components constituting the HMD 100A. Further, FIG. 5 is a functional block diagram of the components constituting the HMD 100B.

As shown in FIG. 4, the HMD 100A is provided with an interface 114 to which a variety of types of external equipment OA to be a supply source of the content are connected. As the interface 114, there can be used an interface compatible with wired connection such as a USB interface, a micro USB interface, or an interface for a memory card, and it is also possible for the interface 114 to be formed of a wireless communication interface. The external equipment OA is an image supply device for supplying the HMD 100 with an image, and there are used a personal computer (PC), a cellular phone unit, a portable game machine, and so on.

The control device 10A includes a control section 140, an input information acquisition section 110, a storage section 120, a transmitting section (Tx) 51, and a transmitting section (Tx) 52.

The input information acquisition section 110 is connected to an operation section 135 including the track pad 14, the arrow keys 16, the power switch 18, and so on described above. The input information acquisition section 110 detects the operation content in the operation section 135 based on the signal input from the operation section 135, and then outputs the operation data representing the operation content to the control section 140. Further, the control device 10A is provided with a power supply section (not shown), and supplies each section of the control device 10A and the image display section 20 with the power.

The storage section 120 is a nonvolatile storage device, and stores a variety of computer programs to be executed by the control section 140, and the data related to these programs. Further, it is also possible for the storage section 120 to store the data of a still image and a moving image to be displayed on the image display section 20.

The storage section 120 stores configuration data 121. The configuration data 121 includes a variety of types of setting values used by the control section 140. The setting values included in the configuration data 121 can be values input by the operation of the operation section 135 in advance, or it is also possible to receive the setting values from the external equipment OA or other devices (not shown) via the communication section 117 or the interface 114, and then store the setting values.

Further, the storage section 120 stores detecting data 122, menu image data 123, transmission image data 124, and instruction content data 125.

The detecting data 122 is the data used for detecting an image of a work object from the image data. The work object is a target of the work performed by the worker wearing the HMD 100B, and it is conceivable that the work object is located in the view field of the worker when working. The detecting data 122 includes, for example, the data used for the process of extracting the image of the work object from the image data, and more specifically includes the data of the feature amount of the image of the work object. The feature amount can also be the feature amount of the color or the feature amount of the shape, and it is also possible to include a plurality of feature amounts in accordance with the number of colors and the resolution of the image data as the processing target. In the display system 1, in the case in which the work object targeted by the worker wearing the HMD 100B has previously been found out, the detecting data 122 related to the work object is stored in the storage section 120.

The menu image data 123 is the data of the image for displaying the menu image on the image display section 20. The menu image is, for example, a menu bar having icons for the operations arranged in a line, or a dial-type menu having icons arranged in a circular frame.

The transmission image data 124 is the image data used for the pointing information transmitted by the HMD 100A to the HMD 100B, and is the image data of an image of the pointing object such as an arm, a hand, a finger, or a pointer rod. Although the details will be described later, it is possible to include a taken image of the pointing object taken by the camera 61 in the pointing information, but it is also possible to use the image of the pointing object prepared in advance instead of the taken image. The transmission image data 124 is the image data which can be included in the pointing information instead of the taken image. The transmission image data 124 is, for example, the image data of an image resembling an arm, a hand, or a finger of the worker, but can also be the image data of an image of a pointer constituted by a symbol such as an arrow, and the type or the content of the transmission image data 124 is not particularly limited.

The instruction content data 125 is the data of the content transmitted by the HMD 100A to the HMD 100B, and can include text data, still image data, moving image data, sound data, and so on.

To the control section 140, there are connected a triaxial sensor 113, a GPS 115, and a communication section 117. The triaxial sensor 113 is a triaxial acceleration sensor, and the control section 140 obtains the detection value of the triaxial sensor 113. Due to the triaxial sensor 113, the control section 140 is capable of detecting the motion of the control device 10A, and is capable of detecting an operation of, for example, swinging the control device 10A. Further, the triaxial sensor 113 can also be replaced with a nine-axis sensor. In this case, it is possible for the control section 140 to obtain the detection values of a triaxial acceleration sensor, a triaxial angular velocity sensor, and a triaxial geomagnetic sensor to thereby detect the attitude, the orientation, and the motion of the control device 10A.

The GPS 115 is provided with an antenna (not shown), and receives a GPS (Global Positioning System) signal to calculate the present position of the control device 10A. The GPS 115 outputs the present position and the current time, which have been obtained based on the GPS signal, to the control section 140. Further, it is also possible for the GPS 115 to be provided with a function of obtaining the current time based on the information included in the GPS signal to correct the time kept by the control section 140.

The communication section 117 performs wireless data communication compliant with a standard such as the wireless LAN (WiFi (registered trademark)), Miracast (registered trademark), or Bluetooth (registered trademark).

In the case in which the external equipment OA is wirelessly connected to the communication section 117, the control section 140 obtains the content data from the communication section 117, and then makes the image display section 20 display the image. In contrast, in the case in which the external equipment OA is connected to the interface 114 with wire, the control section 140 obtains the content data from the interface 114, and then makes the image display section 20 display the image. The communication section 117 and the interface 114 function as a data acquisition section DA for obtaining the content data from the external equipment OA.

The control section 140 is provided with a CPU (not shown) for executing the programs, a RAM (not shown) for temporality storing the programs executed by the CPU and data, and a ROM (not shown) for storing a basic control program executed by the CPU and data in a nonvolatile manner. The control section 140 retrieves and then executes the computer programs stored in the storage section 120 to thereby function as an operating system (OS) 150, an image processing section 160, and a display control section 170. Further, the control section 140 executes the programs described above to thereby function as a communication control section 181, a received information processing section 182, an operation detection section 183, an operation period display control section 184, a transmission image acquisition section 185, a pointing information generation section 186, and a sound processing section 187.

The image processing section 160 obtains the image signal included in the content. The image processing section 160 separates sync signals such as a vertical sync signal VSync and a horizontal sync signal HSync from the image signal thus obtained. Further, the image processing section 160 generates a clock signal PCLK using a phase locked loop (PLL) circuit or the like (not shown) in accordance with the periods of the vertical sync signal VSync and the horizontal sync signal HSync thus separated. The image processing section 160 converts the analog image signal, from which the sync signals are separated, into a digital image signal using an A/D conversion circuit or the like (not shown). The image processing section 160 stores the digital image signal obtained by the conversion into the RAM in the control section 140 frame by frame as the image data (Data in the drawing) of the target image. The image data is, for example, RGB data.

It should be noted that it is also possible for the image processing section 160 to perform a resolution conversion process for converting the resolution of the image data into the resolution suitable for the right display drive section 22 and the left display drive section 24 if necessary. Further, it is also possible for the image processing section 160 to perform an image adjustment process for adjusting the luminance and the chroma of the image data, a 2D/3D conversion process for generating 2D image data from 3D image data or generating 3D image data from 2D image data, and so on.

The image processing section 160 transmits each of the clock signal PCLK, the vertical sync signal VSync, the horizontal sync signal HSync, and the image data Data stored in the RAM via each of the transmitting sections 51, 52. The transmitting sections 51, 52 each function as a transceiver to perform serial transmission between the control device 10A and the image display section 20. It should be noted that the image data Data transmitted via the transmitting section 51 is referred to as "right eye image data," and the image data Data transmitted via the transmitting section 52 is referred to as "left eye image data."

The display control section 170 generates control signals for controlling the right display drive section 22 and the left display drive section 24, and controls generation and emission of the image light by each of the right display drive section 22 and the left display drive section 24 using the control signals. Specifically, the display control section 170 controls ON/OFF of the drive of the right LCD 241 by a right LCD control section 211 and ON/OFF of the drive of the right backlight 221 by a right backlight control section 201. Further, the display control section 170 controls ON/OFF of the drive of the left LCD 242 by a left LCD control section 212 and ON/OFF of the drive of the left backlight 222 by a left backlight control section 202.

The communication control section 181 controls the communication section 117 to thereby control the communication with the HMD 100B. The communication control section 181 receives work information from the HMD 100B, and then outputs the work information thus received to the received information processing section 182. Further, the communication control section 181 performs a process of transmitting the pointing information generated by the pointing information generation section 186 to the HMD 100B.

The received information processing section 182 analyzes the work information received by the communication control section 181 to extract the image data included in the work information. The received information processing section 182 detects the image of the work object from the image data included in the work information using, for example, the detecting data 122 stored in the storage section 120.

The operation detection section 183 detects an operation of the commander wearing the HMD 100A. The operation detection section 183 detects the operation of the operation section 135 based on the operation data input from the input information acquisition section 110. Further, the operation detection section 183 detects the operation of the commander wearing the HMD 100A using the camera 61. In this case, the operation detection section 183 detects the image of the pointing object used by the commander from the taken image data of the camera 61. The pointing objects used by the commander include, for example, an arm, a hand, a finger of the commander, and a pointer rod. The operation detection section 183 identifies the pointing position of the pointing object based on the position of the image of the pointing object in the taken image. Further, it is also possible for the operation detection section 183 to detect the operation in the case in which the pointing position thus identified forms a trajectory corresponding to a pattern set in advance. This action is a so-called a gesture manipulation in which the commander moves the pointing object to provide different instructions using the types of the movement.

The operation period display control section 184 controls the display of the image display section 20 in the period in which the operation detection section 183 detects the operation. The operation period display control section 184 retrieves the menu image data 123 and so on from the storage section 120, then controls the image processing section 160 and the display control section 170 to display the menu image and so on. Thus, in the case in which, for example, the commander performs the operation using the pointing object or the operation section 135, a character or an image to be an index or an indication of the motion of the pointing object, or a menu bar image for making the position input possible can be displayed on the image display section 20.

The transmission image acquisition section 185 obtains the image of the pointing object to be included in the pointing information to be transmitted to the HMD 100B. In the case of taking the image of the pointing object using the camera 61, the transmission image acquisition section 185 extracts the image of the pointing object from the taken image of the camera 61 to thereby obtain the image of the pointing object. Further, in the case in which it is set by the operation of the commander or the previous setting that the image of the pointing object is obtained from the storage section 120, the transmission image acquisition section 185 obtains the transmission image data 124.

The pointing information generation section 186 generates the pointing information to be transmitted to the HMD 100B. The pointing information is the data to be transmitted by the HMD 100A to the HMD 100B, and includes either one or both of image data and sound data of the content, image data of the pointing object, sound data of the commander generated by the sound processing section 187, and data representing the position or the motion of the pointing object in the present embodiment.

The sound processing section 187 obtains a sound signal included in the content, amplifies the sound signal thus obtained, and then outputs the result to the right earphone 32 and the left earphone 34. Further, the sound processing section 187 obtains the sound collected by the microphone 63, and then converts the sound into digital sound data. It is also possible for the sound processing section 187 to perform a process set in advance on the digital sound data.

The image display section 20 is provided with the camera 61 as described above and a distance sensor 64. Further, the image display section 20 is provided with an interface 25, the right display drive section 22, the left display drive section 24, the right light guide plate 261 as the right optical image display section 26, the left light guide plate 262 as the left optical image display section 28, a nine-axis sensor 66, and an eye sensor 68.

The nine-axis sensor 66 is a motion sensor for detecting acceleration (3 axes), angular velocities (3 axes), and geomagnetisms (3 axes). In the case in which the image display section 20 is mounted on the head of the user, it is possible for the control section 140 to detect the motion of the head of the user based on the detection values of the nine-axis sensor 66. For example, it is possible for the control section 140 to estimate the level of the tilt and the direction of the tilt of the image display section 20 based on the detection values of the nine-axis sensor 66.

The interface 25 is provided with a connector to which the right cord 42 and the left cord 44 are connected. The interface 25 outputs the clock signal PCLK, the vertical sync signal VSync, the horizontal sync signal HSync, and the image data Data transmitted from the transmitting section 51 to the corresponding receiving sections (Rx) 53, 54. Further, the interface 25 outputs the control signals, which are transmitted from the display control section 170, to the receiving sections 53, 54, the right backlight control section 201 or the left backlight control section 202 corresponding to the control signals.

Further, the interface 25 is an interface for connecting the camera 61, the distance sensor 64, the nine-axis sensor 66, and the eye sensor 68 to each other. The taken image data of the camera 61, the detection result of the distance sensor 64, the detection result of the acceleration (three axes), the angular velocity (three axes), and geomagnetism (three axes) provided by the nine-axis sensor 66, and the detection result of the eye sensor 68 are transmitted to the control section 140 via the interface 25.

The right display drive section 22 is provided with the right backlight 221, the right LCD 241, and the right projection optical system 251 described above. Further, the right display drive section 22 is provided with the receiving section 53, the right backlight (BL) control section 201 for controlling the right backlight (BL) 221, and the right LCD control section 211 for driving the right LCD 241.

The receiving section 53 acts as a receiver corresponding to the transmitting section 51, and performs the serial transmission between the control device 10A and the image display section 20. The right backlight control section 201 drives the right backlight 221 based on the control signal input to the right backlight control section 201. The right LCD control section 211 drives the right LCD 241 based on the clock signal PCLK, the vertical sync signal VSync, the horizontal sync signal HSync, and the right-eye image data Data input via the receiving section 53.

The left display drive section 24 has substantially the same configuration as that of the right display drive section 22. The left display drive section 24 is provided with the left backlight 222, the left LCD 242, and the left projection optical system 252 described above. Further, the left display drive section 24 is provided with the receiving section 54, the left backlight control section 202 for driving the left backlight 222, and the left LCD control section 212 for driving the left LCD 242.

The receiving section 54 acts as a receiver corresponding to the transmitting section 52, and performs the serial transmission between the control device 10A and the image display section 20. The left backlight control section 202 drives the left backlight 222 based on the control signal input to the left backlight control section 202. The left LCD control section 212 drives the left LCD 242 based on the clock signal PCLK, the vertical sync signal VSync, the horizontal sync signal HSync, and the left-eye image data Data input via the receiving section 54.

It should be noted that the right backlight control section 201, the right LCD control section 211, the right backlight 221, and the right LCD 241 are also collectively referred to as a right "image light generation section." Similarly, the left backlight control section 202, the left LCD control section 212, the left backlight 222, and the left LCD 242 are also collectively referred to as a left "image light generation section."

As shown in FIG. 5, the HMD 100B has a configuration having the image display section 20, which is explained with reference to FIG. 4, and the control device 10B connected to each other.

The control device 10B has a control section 300 instead of the control section 140 (FIG. 4), and has a storage section 340 instead of the storage section 120 (FIG. 4). Other constituents are common to the control device 10B and the control device 10A as shown in FIG. 4.

The storage section 340 is a nonvolatile storage device similar to the storage section 120, and stores a variety of computer programs, and the data related to these programs. Further, it is also possible for the storage section 340 to store the data of a still image and a moving image to be displayed on the image display section 20.

The storage section 340 stores configuration data 341. The configuration data 341 includes a variety of types of setting values used by the control section 300. The setting values included in the configuration data 341 can be values input by the operation of the operation section 135 in advance, or it is also possible to receive the setting values from the external equipment OA or other devices (not shown) via the communication section 117 or the interface 114, and then store the setting values.

Further, the storage section 340 is a nonvolatile storage device, and stores a variety of computer programs to be executed by the control section 300, and the data related to these programs. Further, the storage section 340 stores detecting data 343, menu image data 345, transmission image data 124, and instruction content data 125.

The detecting data 343 is the data used for detecting an image of a work object from the image data. The detecting data 343 includes, for example, the data used for the process of extracting the image of the work object from the image data, and more specifically includes the data of the feature amount of the image of the work object. The feature amount can also be the feature amount of the color or the feature amount of the shape, and it is also possible to include a plurality of feature amounts in accordance with the number of colors and the resolution of the image data as the processing target. The detecting data 343 stored in the storage section 340 can be the same as the configuration data 121, or can also be data different from the configuration data 121.

The menu image data 345 is the data of the menu image displayed by the image processing section 303 and the display control section 305.

Similarly to the control section 140, the control section 300 is provided with a CPU (not shown) for executing the programs, a RAM (not shown) for temporality storing the programs executed by the CPU and data, and a ROM (not shown) for storing a basic control program executed by the CPU and data in a nonvolatile manner. The control section 300 retrieves and then executes the computer programs stored in the storage section 340 to thereby function as an operating system (OS) 301, an image processing section 303, and a display control section 305. Further, the control section 300 functions as a communication control section 311, a taken image control section 313, a work information generation section 315, a received information analysis section 317, a pointing detection section 319, a display position calculation section 321, an operation detection section 323, a display information generation section 325, and a sound processing section 329.

The image processing section 303 obtains the image signal included in the content. The image processing section 303 separates the sync signals such as the vertical sync signal VSync and the horizontal sync signal HSync from the image signal thus obtained. Further, the image processing section 303 generates the clock signal PCLK using a phase locked loop (PLL) circuit or the like (not shown) in accordance with the periods of the vertical sync signal VSync and the horizontal sync signal HSync thus separated. The image processing section 303 converts the analog image signal, from which the sync signals are separated, into a digital image signal using an A/D conversion circuit or the like (not shown). The image processing section 303 stores the digital image signal obtained by the conversion into the RAM in the control section 300 frame by frame as the image data (Data in the drawing) of the target image. The image data is, for example, RGB data.

It should be noted that it is also possible for the image processing section 303 to perform a resolution conversion process for converting the resolution of the image data into the resolution suitable for the right display drive section 22 and the left display drive section 24 if necessary. Further, it is also possible for the image processing section 303 to perform an image adjustment process for adjusting the luminance and the chroma of the image data, a 2D/3D conversion process for generating 2D image data from 3D image data or generating 3D image data from 2D image data, and so on.

The image processing section 303 transmits each of the clock signal PCLK, the vertical sync signal VSync, the horizontal sync signal HSync, and the image data Data stored in the RAM via each of the transmitting sections 51, 52. The transmitting sections 51, 52 each function as a transceiver to perform serial transmission between the control device 10B and the image display section 20. It should be noted that the image data Data transmitted via the transmitting section 51 is referred to as "right eye image data," and the image data Data transmitted via the transmitting section 52 is referred to as "left eye image data."

The display control section 305 generates control signals for controlling the right display drive section 22 and the left display drive section 24, and controls generation and emission of the image light by each of the right display drive section 22 and the left display drive section 24 using the control signals. Specifically, the display control section 305 controls ON/OFF of the drive of the right LCD 241 by the right LCD control section 211 and ON/OFF of the drive of the right backlight 221 by the right backlight control section 201. Further, the display control section 305 controls ON/OFF of the drive of the left LCD 242 by the left LCD control section 212 and ON/OFF of the drive of the left backlight 222 by the left backlight control section 202.

The communication control section 311 controls the communication section 117 to thereby control the communication with the HMD 100A. The communication control section 311 performs a process of transmitting the data, which includes the transmission information generated by the work information generation section 315, to the HMD 100A. Further, the communication control section 311 receives the data transmitted by the HMD 100A, and then outputs the data thus received to the received information analysis section 317.

The taken image control section 313 controls the camera 61 to perform imaging to thereby obtain the taken image data.

The work information generation section 315 obtains the data to be transmitted to the HMD 100A, and then generates the work information based on the data thus obtained. The work information generation section 315 obtains the taken image data taken by the camera 61. Further, it is also possible for the work information generation section 315 to obtain the detection value of at least a part of the sensors consisting of the distance sensor 64, the nine-axis sensor 66, and the eye sensor 68, and in this case, there is generated the work information including the taken image data taken by the camera 61 and the detection value of the sensor. Although the sensors, the detection values of which are obtained by the work information generation section 315, are set in advance, it is also possible for the HMD 100A to transmit a setting command to the HMD 100B to designate the detection values to be obtained. Further, it is also possible for the work information generation section 315 to generate not only the taken image data taken by the camera 61 itself, but also the work information including the image data generated from the taken image data.

The received information analysis section 317 analyzes the data received by the communication control section 311. In the present embodiment, the received information analysis section 317 extracts the image data of the pointing object, the image data, the sound data, and so on of the content included in the pointing information received by the communication control section 311. Further, the received information analysis section 317 extracts the data representing the position and the motion of the pointing object from the pointing information received by the communication control section 311.

The pointing detection section 319 detects the data representing the fact that the operation using the pointing object is performed out of the data extracted by the received information analysis section 317. It is possible for the commander to operate the HMD 100A to perform the position pointing operation using the pointing object, and to control the HMD 100B using the position pointing operation. In this case, the data related to the position pointing operation included in the pointing information transmitted by the HMD 100A is detected by the HMD 100B as an operation of a GUI. The data for designating whether or not the operation of the commander is detected as the operation of the GUI is included in the pointing information transmitted by the HMD 100A, and is detected by the pointing detection section 319.

The display position calculation section 321 calculates the position, at which the image is displayed, based on the image data extracted by the received information analysis section 317. The image data extracted by the received information analysis section 317 corresponds to the image data of the pointing object, the image data of the content, and other image data. The display position calculation section 321 calculates the display position of each of the display position of the image of the pointing object, the display position of the image data of the content, and the display positions of other images based on the data described above. Further, it is also possible for the display position calculation section 321 to calculate a display size of each of the images. Further, in the case in which the pointing detection section 319 detects the data of instructing to use the operation of the commander as the operation of the GUI, the display position calculation section 321 calculates the display position of the menu image used for performing the GUI operation.

In the case in which the data representing the position and the motion of the pointing object extracted by the received information analysis section 317 is detected as the operation of the GUI, the operation detection section 323 detects the operation. The operation detection section 323 detects the operation of the GUI based on the display positions of the icon of the menu image and so on calculated by the display position calculation section 321 and the display position of the image of the pointing object.

The display information generation section 325 generates the display information of the screen displayed by the image display section 20. The display information generation section 325 disposes the images based on the image data extracted by the received information analysis section 317 at the display positions calculated by the display position calculation section 321 to generate the display information corresponding to the entire screen. The display information generated by the display information generation section 325 is transmitted to the image display section 20 due to the actions of the display control section 170 and the display control section 305, and is displayed by the image display section 20.

The sound processing section 329 obtains a sound signal included in the content, amplifies the sound signal thus obtained, and then outputs the result to the right earphone 32 and the left earphone 34. Further, the sound processing section 329 obtains the sound collected by the microphone 63, and then converts the sound into digital sound data. It is also possible for the sound processing section 329 to perform a process set in advance on the digital sound data.

In the display system 1 having the configuration described above, the HMD 100B corresponds to a display device and a first display device, and the HMD 100A corresponds to a second display device. The image display section 20 provided to the HMD 100B corresponds to a first display section, the communication section 117 corresponds to a first communication section, the control section 300 corresponds to a control section and a first control section, and the camera 61 corresponds to an imaging section. Further, the image display section 20 provided to the HMD 100A corresponds to a second display section, the communication section 117 corresponds to a second communication section, and the control section 140 corresponds to a second control section.

Figures 6A, 6B:
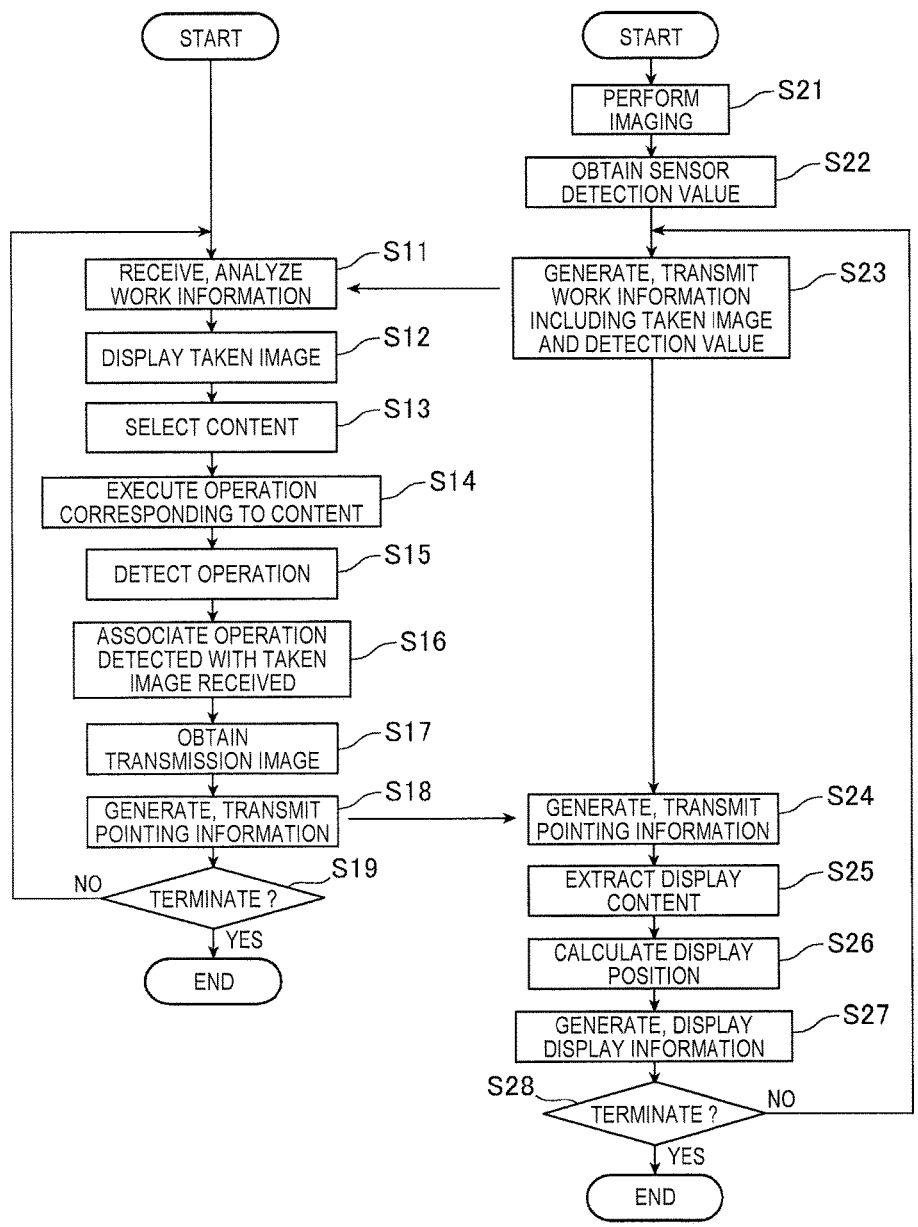
FIGS. 6A and 6B are flowcharts showing an action of a display system.

FIGS. 6A and 6B are flowcharts showing an action of the display system 1, wherein FIG. 6A shows an action of the HMD 100A, and FIG. 6B shows an action of the HMD 100B. FIGS. 6A and 6B show an example in which one HMD 100A and one HMD 100B act together.

In the HMD 100B, the imaging control section 313 controls the camera 61 to perform imaging to thereby obtain (step S21) the taken image data, and the work information generation section 315 obtains (step S22) the detection values of the respective sensors.

Subsequently, the work information generation section 315 generates the work information including the taken image data in the step S21, and the data of the detection values obtained in the step S22, and then the communication control section 311 transmits the data to the HMD 100A (step S23).

In the HMD 100A, the communication control section 181 receives the work information having been transmitted from the HMD 100B, and then the received information processing section 182 analyzes the work information thus received (step S11). The received information processing section 182 extracts the data of the taken image from the work information thus received to make the image processing section 160 and the display control section 170 display the taken image (step S12). Further, in the case in which the detection value of the sensor is included in the work information received by the communication control section 181, it is also possible for the received information processing section 182 to generate data for displaying the detection value of the sensor so as to be superimposed on the taken image, and then make the image processing section 160 and the display control section 170 display the detection value.

Subsequently, in the HMD 100A, the content is selected (step S13) due to the operation of the commander, and the operation for the commander to give an instruction and so on to the worker is performed (step S14). In the step S13, a supporting content including a text and an image, for example, is selected. In the step S14, an operation of pointing the position to which the worker is made to pay attention is performed with respect to, for example, the image, which has been received by the communication control section 181, and is being displayed. The operation in the step S14 is an operation on the operation section 135, or the operation of the commander moving the pointing object in front of the HMD 100A. This operation is detected (step S15) by the operation detection section 183, and the operation detection section 183 generates the data of the operation thus detected.

The operation detection section 183 generates (step S16) the data for making the operation position and the operation trajectory of the operation thus detected correspond to the taken image of the HMD 100B presently displayed. Thus, there can be obtained the data representing a specific position in the view field of the worker. The transmission image acquisition section 185 clips the image of the pointing object from the taken image taken by the camera 61 during the operation in the step S14, or retrieves the transmission image data 124 from the storage section 120, to obtain the transmission image (step S17).

The pointing information generation section 186 generates and then transmits the pointing information including the image data of the image of the pointing object obtained by the transmission image acquisition section 185, the data representing the operation position and the trajectory of the operation, and the data for making the operation position and the trajectory of the operation correspond to the taken image of the HMD 100B (step S18).

The control section 140 determines (step S19) whether or not a termination condition of the action has been fulfilled, and if the termination condition has not been fulfilled (NO in the step S19), the process returns to the step S11. Further, if the termination condition has been fulfilled (Yes in the step S19), the present process is terminated. As the termination condition, there can be cited, for example, the fact that the termination of the action or shutdown of the HMD 100A is instructed by the operation on the operation section 135.

The HMD 100B receives (step S24) the pointing information transmitted by the HMD 100A with the communication control section 311, and then the received information analysis section 317 analyzes the pointing information thus received to extract (step S25) the image data. Subsequently, the display position calculation section 321 calculates the positions at which the images are displayed based on the respective image data (step S26). Further, the display information generation section 325 generates the display information with the images disposed at the display positions thus calculated, and then makes the image processing section 303 and the display control section 305 display the images (step S27).

The control section 300 determines (step S28) whether or not a termination condition of the action has been fulfilled, and if the termination condition has not been fulfilled (NO in the step S28), the process returns to the step S23. Further, if the termination condition has been fulfilled (Yes in the step S28), the present process is terminated. As the termination condition, there can be cited, for example, the fact that the termination of the action or shutdown of the HMD 100B is instructed by the operation on the operation section 135.

Figure 7A:
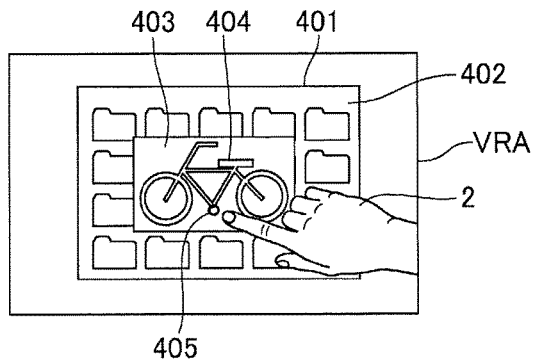
FIGS. 7A through 7D are diagrams each showing a display example of a head mounted display.
Figure 7B:
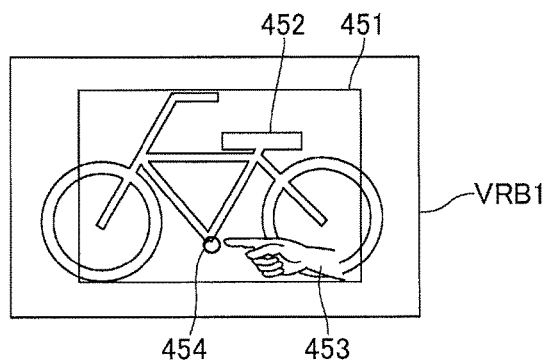
Figure 7C:
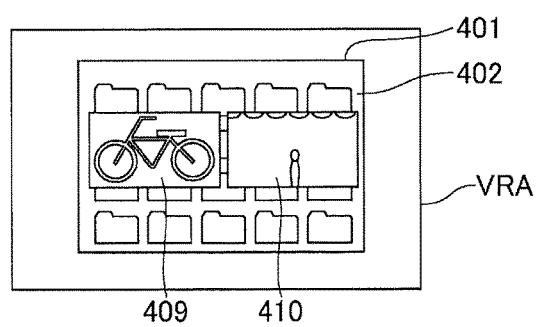
Figure 7D:
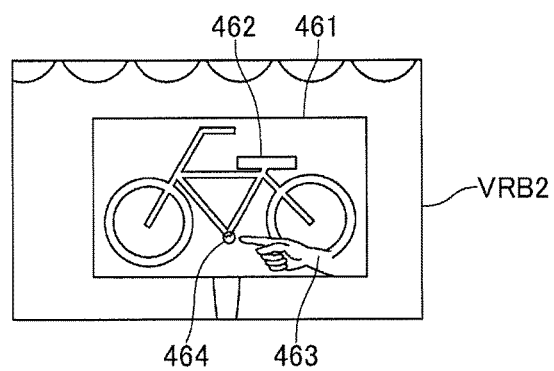

FIGS. 7A through 7D are diagrams each showing a display example in the HMD 100A, 100B, wherein FIG. 7A shows the view field VRA of the commander wearing the HMD 100A, and FIG. 7B shows the view field VRB1 of the worker wearing the HMD 100B. Further, FIG. 7C shows another example of the view field VRA of the commander wearing the HMD 100A, and FIG. 7D shows the view field VRB2 of another worker wearing the HMD 100B. It should be noted that FIGS. 7A through 7D each show an example of the view field of the right eye of the commander or the worker, and the view field of the left eye is the same as or bilaterally symmetrical with the respective drawings, and is therefore omitted from the graphical description.

Here, in the pointing information (guide information) generated by the pointing information generation section 186, the information for associating the operation and the work information with each other, or the specific configuration of the information to be associated with the taken image included in the work information is not particularly limited. Although in the example described above, the explanation is presented assuming that the operation position and the trajectory of the operation are the data to be associated with the taken image of the HMD 100B, it is also possible to simply use the operation position and the trajectory of the operation as the information described above. Further, it is also possible to adopt the data for making the operation position and the trajectory of the operation correspond to the taken image of the HMD 100B using the correspondence of the file manes, types of the data, ID, attribute, or the positions, and it is sufficient for the data to be the information making it possible to recognize the correspondence as a result.

In the view field VRA of the commander shown in FIG. 7A, the area corresponding to the half mirror 261A becomes the display area 401, and the image to be drawn in the right LCD 241 (FIG. 4) is displayed in the display area 401. In the example shown in FIG. 7A, a normal operation screen 402 is displayed in the display area 401. The normal operation screen 402 is a screen displayed using the function of the OS 150 and the function of an application program running on the OS 150, and is the screen related to the operation of files and folders in the example shown in FIG. 7A.

In the case in which the HMD 100A has received the work information from the HMD 100B, the HMD 100A displays the taken image of the HMD 100B as shown in FIG. 7A (the step S12 shown in FIG. 6A). The display area 403 for displaying the taken image is disposed in the display area 401, the taken image is displayed in the display area 403. Since the half mirror 261A transmits the outside view, the commander visually recognizes the pointing object 2 operated by the commander through the display area 401. It should be noted that in the example shown in FIG. 7A, the pointing object 2 is a hand of the commander. The commander performs the operation of, for example, pointing with the pointing object 2 to the image 404 of the work object displayed in the display area 401. The HMD 100A detects a pointing position 405 pointed by the pointing object 2 using the operation detection section 183, and then calculates the relative position between the pointing position 405 and the taken image presently displayed in the display area 403.

In the view field VRB1 of the worker shown in FIG. 7B, the area corresponding to the half mirror 261A becomes the display area 451, and the image to be drawn in the right LCD 241 (FIG. 5) is displayed in the display area 451. Since the half mirror 261A transmits the outside view, the work object 452 located in the view field of the worker is visually recognized through the display area 451. Further, in the display area 451, there is displayed an image 453 of the pointing object pointing the pointing position 454 pointed by the commander with the pointing object 2. The image 453 of the pointing object is displayed based on the image data include in the pointing information received (the step S24 shown in FIG. 6B) by the HMD 100B from the HMD 100A. Further, the position of the pointing position 454 is designated by the data included in the pointing information.

As shown in FIGS. 7A and 7B, since the commander wearing the HMD 100A can see the taken image obtained by taking the image of the view field of the worker, it is possible to perform an instruction or the like related to the work while observing the view field of the worker. Further, since the pointing position pointed by the commander with the pointing object 2 is detected by the HMD 100A, and the data representing the pointing position with respect to the taken image is transmitted to the HMD 100B, it is possible for the worker to see the image 453 of the pointing object so as to be superimposed on the outside view in the actual view field. Therefore, it is possible for the worker to have an instruction with the image superimposed on the work object actually viewed as the outside view. Further, since the image 453 of the pointing object is displayed based on the data transmitted by the HMD 100A to the HMD 100B, it is possible for the HMD 100A to select which one of the taken image of the actual pointing object 2 and the image prepared in advance is used as the image of the pointing object. Here, it is also possible to store the image data for displaying the image of the pointing object in the storage section 340 of the HMD 100B in advance, and include the data for designating the image stored in the HMD 100B in the pointing information transmitted by the HMD 100A to the HMD 100B.

As shown in FIG. 1, the display system 1 can be used with a plurality of HMD 100B connected to the communication network 4. In this case, the HMD 100A is capable of receiving the work information from the plurality of HMD 100B to display the work information thus received.

FIG. 7C shows an example in which the HMD 100A displays the taken images based on the work information received from the two HMD 100B. In the example shown in FIG. 7C, two display areas 409, 410 for displaying the taken images are disposed in the display area 401. In the display area 409, there is displayed an image based on the work information transmitted by one of the HMD 100B. Further, in the display area 410, there is displayed an image based on the work information transmitted by the other of the HMD 100B. In the case in which pointing with the pointing object 2 is performed on the images displayed in the display areas 409, 410, the HMD 100A generates and then transmits the pointing information to the HMD 100B having transmitted the work information corresponding to the position thus pointed.

Further, in the case in which the display system 1 includes a plurality of HMD 100B, it is also possible to transmit the pointing information, which has been transmitted by the HMD 100A to one of the HMD 100B, to another of the HMD 100B. FIG. 7D shows the display example in this case. FIG. 7D shows the display example in the case in which the pointing information shown in FIG. 7B as an example is received by another of the HMD 100B.

In the view field VRB2 of another worker wearing the HMD 100B, the image 462 of the work object is displayed in the display area 461 corresponding to the half mirror 261A, and the image 463 of the pointing object pointing the pointing position 464 is displayed. In the view field VRB2, the work object does not show, but an unrelated outside view shows unlike the view field VRB1 of the worker shown in FIG. 7B. If the pointing information transmitted by the HMD 100A includes the taken image of the HMD 100B, it is possible to display the image 462 of the work object in the display area 461 as shown in FIG. 7D. In this example, it is possible for other workers to know the content of the pointing information transmitted to either one of the workers.

As explained hereinabove, the display system 1 according to the first embodiment to which the invention is applied is provided with the HMD 100B and the HMD 100A of the head mounted type. The HMD 100B is provided with the image display section 20 for displaying an image so that the outside view can visually be recognized, and the camera 61 for taking an image of a range including at least a part of the outside view which can visually be recognized in the image display section 20. Further, the HMD 100B is further provided with the communication section 117 for transmitting the work information generated based on the taken image taken by the camera 61 to the HMD 100A, and receiving the pointing information from the HMD 100A, and the control section 300 for making the image display section 20 display the image based on the pointing information received by the communication section 117. The HMD 100A is provided with the image display section 20, and the communication section 117 for receiving the work information from the HMD 100B and transmitting the pointing information to the HMD 100B. Further, the HMD 100A is provided with the display control section 305 for making the image display section 20 display an image based on the work information received by the communication section 117, the operation detection section 183, and the control section 140 for generating and then transmitting the pointing information including the information of associating the operation detected by the operation detection section 183 and the work information with each other.

Therefore, the HMD 100B transmits the work information based on the taken image thus taken to the HMD 100A, the HMD 100A displays the image based on the work information, and the pointing information including the information for associating the operation during the period of displaying the image and the work information with each other is transmitted to the HMD 100B. Therefore, since the information related to the operation associated with the taken image in the HMD 100B can be provided to the HMD 100B using the operation of the HMD 100A, it is possible to transmit a large amount of information to the worker wearing the HMD 100B in an easy-to-understand manner.

Further, the control section 300 of the HMD 100B generates the work information including the taken image taken by the camera 61, and the operation detection section 183 provided to the HMD 100A detects the position pointing operation. The control section 140 generates the pointing information including the information for associating the pointing position of the position pointing operation detected by the operation detection section 183 with the taken image included in the work information. Therefore, it is possible to make the pointing position of the position pointing operation performed in the HMD 100A correspond to the taken image of the HMD 100B. Therefore, it is possible to transmit the content of the position pointing operation performed in the HMD 100A to the worker wearing the HMD 100B.

Further, the control section 140 generates pointing information including the information related to the pointing position of the position pointing operation detected by the operation detection section 183 and the image of the pointing object. The control section 300 receives the pointing information using the communication section 117, and makes the image of the pointing object be displayed at the position corresponding to the pointing position included in the pointing information thus received. Since the HMD 100B displays the image of the pointing object in accordance with the pointing position due to the position pointing operation in the HMD 100A, it is possible to point the position to the worker wearing the HMD 100B using the operation in the HMD 100A.

An application example of the display system 1 will be explained citing a specific example.

The commander can use the display system 1 for the purpose of providing the information related to the operation of the equipment in such a manner that the operation of the equipment is explained and guided from the remote location to support the work in the case in which, for example, the worker performs a work of operating the equipment. Specifically, the display system 1 can be applied in the case of setting a personal computer as the work object, and performing setup or an operation of an application program. Further, the display system 1 can be applied in the case of, for example, setting a machine such as a working machine, an industrial machine, or a variety of types of consumer-electronics devices as the work object, and performing an operation or maintenance of the machine. Specifically, in the case in which the worker for performing the maintenance of a variety of types of machines visits the installation site of the machine as the work object at the request of the user, and performs the maintenance, the commander can use the display system 1 for the purpose of supporting the worker low in proficiency level.

In such a case, the worker located in the working site B in the remote location and the commander located in the command site A such as a service center have the information in common, and it is possible for the commander in the command site A to make the HMD 100B display the AR image to change pointing and display. Further, the support can be achieved by showing the operation with a hand or a finger of the commander located in the command site A as a virtual image using the HMD 100B. In this case, it is effective to place the same equipment as the work object in the working site B in front of the commander in the command site A, and make an explanation while actually operating the equipment. It is possible for the commander to make an instruction and teaching while performing the position pointing operation to the specific region of the actual object in the actual place, and to make the efficient support with a simple operation.

As another application example, by including image data and a text of a name card in the pointing information transmitted from the HMD 100A, it is possible to show the name card to the worker. In this case by including the image data of an image resembling an arm of the commander in the pointing information, it is possible to display the arm holding out the name card on the HMD 100B to realize virtual name card exchange.

It is also possible to perform the name card exchange between the commander in the command site A and the worker in the working site B, and then perform the action explained in the above description of the embodiment.

Further, by the HMD 100A including the data of the content in the pointing information and then transmitting the pointing information to the HMD 100B, it is possible to display the content including a text and an image on the image display section 20 of the HMD 100B. In this case, it is preferable that the display position of the text and the image of the content is set to a position not hindering the visual recognition of the work object in accordance with the actual position of the work object visually recognized through the image display section 20.

Further, it is also possible for the sound data as the data of the content to be included in the pointing information, and to be transmitted from the HMD 100A to the HMD 100B. The sound data of the content can be the data stored in the storage section 120 in advance, or can also be the sound data obtained by collecting the voice of the commander with the microphone 63.

Further, by using an avatar acting as the commander, or an image of the actual face, upper body, or whole body of the commander as the image of the pointing object, it is also possible to realize servicing intended for the consumer instead of the worker. In this case, the commander is changed to a staff of a call center, a private tutor, a tutoring staff of a cram school, or the like. As the purpose of this system, there can be cited a guide or training of an installation or an operation of software of electronic equipment, language teaching, coaching for an examination such as a certification examination, a course in a public qualification such as a driver license, coaching for sports, and so on. Further, for example, in a course of a foreign language conversation, it is possible that the student wears the HMD 100B, the teacher wears the HMD 100A, the HMD 100B performs the AR display so that the shape of the mouth of the teacher is superimposed on the image of the mouth of the student reflected on a mirror, and thus, the pronunciation can visually be taught.

Further, in the case of coaching for study or a sport, the HMD 100A is used in the command site A on the coaching side, and the HMD 100B is used in the working site B on the coached side. Including such a case as described above, the command site A can be called a "management site" where a person performing coaching or management is located, and the HMD 100A can be called a management device. Further, the working sites B, C can be called an "execution site" where a person subject to coaching or teaching and executing leaning, or a person executing the work is located, and the HMD 100B, 100C can be called an execution-side device. Further, the work information transmitted from each of the HMD 100B, 100C to the HMD 100A can be called guide target information or execution-side information, and the pointing information can be called guide information, coaching information or management information.

As a specific example of coaching, teaching and coaching are performed using the content displayed on the HMD 100B or the HMD 100C worn by the person subject to coaching with respect to the learning subjects such as mathematics, English, Japanese, social science, character stroke order, and so on. The same is applied to the case of using the system for the purpose of guiding the operation method of equipment such as a personal computer. Further, in the case of coaching English conversation, by shooting the mouth of the teacher wearing the HMD 100A and the mouth of the student (learner, performer) wearing the HMD 100B, 100C, and then transmitting and receiving the work information including the shot images and the pointing information, more effective learning and coaching can be performed.

As another application example, by the commander wearing the HMD 100A performing the guide of the way, peripheral building, and so on to a person wearing the HMD 100B, the system can be applied to, for example, a tour guide or a guide post in a tourist spot.

Further, in the HMD 100A, 100B, and 100C, it is possible to display specific information in a conspicuous manner such as pop-up, blinking, or display in a fluorescent color. Further, it is also possible to change the display color or the display luminance of the image to be displayed so that the visibility of the outside view transmitting the image display section 20 is enhanced. On this occasion, since the visibility of the image displayed by the image display section 20 drops relatively to the outside view, there is an effect of making the characters and the images included in the display image seem ancillary.

In the display system 1, the taken image at the viewpoint of the worker wearing the HMD 100B can be seen in the HMD 100A in the remote location, and the worker can see the content of the position pointing operation performed by the commander in the HMD 100A. The AR display of the content of the position pointing operation can be achieved using, for example, the image 453 of the pointing object. Specifically, in the HMD 100B, the image 453 of the pointing object is displayed so as to overlap the work object 452 viewed by the worker as the outside view, and due to the positions of the image 453 of the pointing object and the work object 452, the display effect as augmented reality (AR) can be expected. In order to enhance the effect of the AR display, it is possible for the HMD 100B to display the images having the parallax between the right display drive section 22 and the left display drive section 24 when displaying the image 453 of the pointing object and so on. In this case, the control section 300 determines the direction and the level of the parallax in accordance with the type of the work object and the work content. The display information generation section 325 of the control section 300 generates the images having the parallax based on the pointing information, and then makes the image processing section 303 and the display control section 305 display the images. Further, it is also possible for the control section 300 to detect the distance to the work object using the distance sensor 64. In this case, it is possible for the control section 300 to calculate the direction and the level of the parallax of the images of the pointing object on which the AR display is performed based on the distance to the work object thus detected. For example, it is also possible to provide the parallax based on the distance condition set in advance. In this case, the images showing the range of the reach of the worker wearing the HMD 100B, 100V are visually recognized in a stereoscopic manner. Further, it is also possible to arrange that the images provided with the parallax are displayed in the HMD 100A so that the commander can visually recognize the images in a stereoscopic manner.

Further, as explained with reference to FIGS. 7C and 7D, it is possible for the worker wearing the HMD 100B in the working site C to see the working operation of the worker in the working site B from the remote location as the AR image. Thus, it is possible to have the content of the work support such as the work procedure in common.

Further, if the display of the HMD 100A and the taken image of the HMD 100B, or the taken images of two or more HMD 100B are displayed in the two or more display areas using the HMD 100A, the commander can visually recognize a lot of circumstances.

Here, as shown in FIG. 7C, in the case of displaying the images corresponding to two or more HMD 100B in two or more display areas, it is also possible to adopt a configuration in which the shapes and the colors of the pointers or the like in the respective display areas are made different from each other to thereby prevent the confusion of the display areas.

Besides the above, the application range of the display system 1 is not at all limited, and applications to other purposes can obviously be made.

Second Embodiment

Figures 8A, 8B:
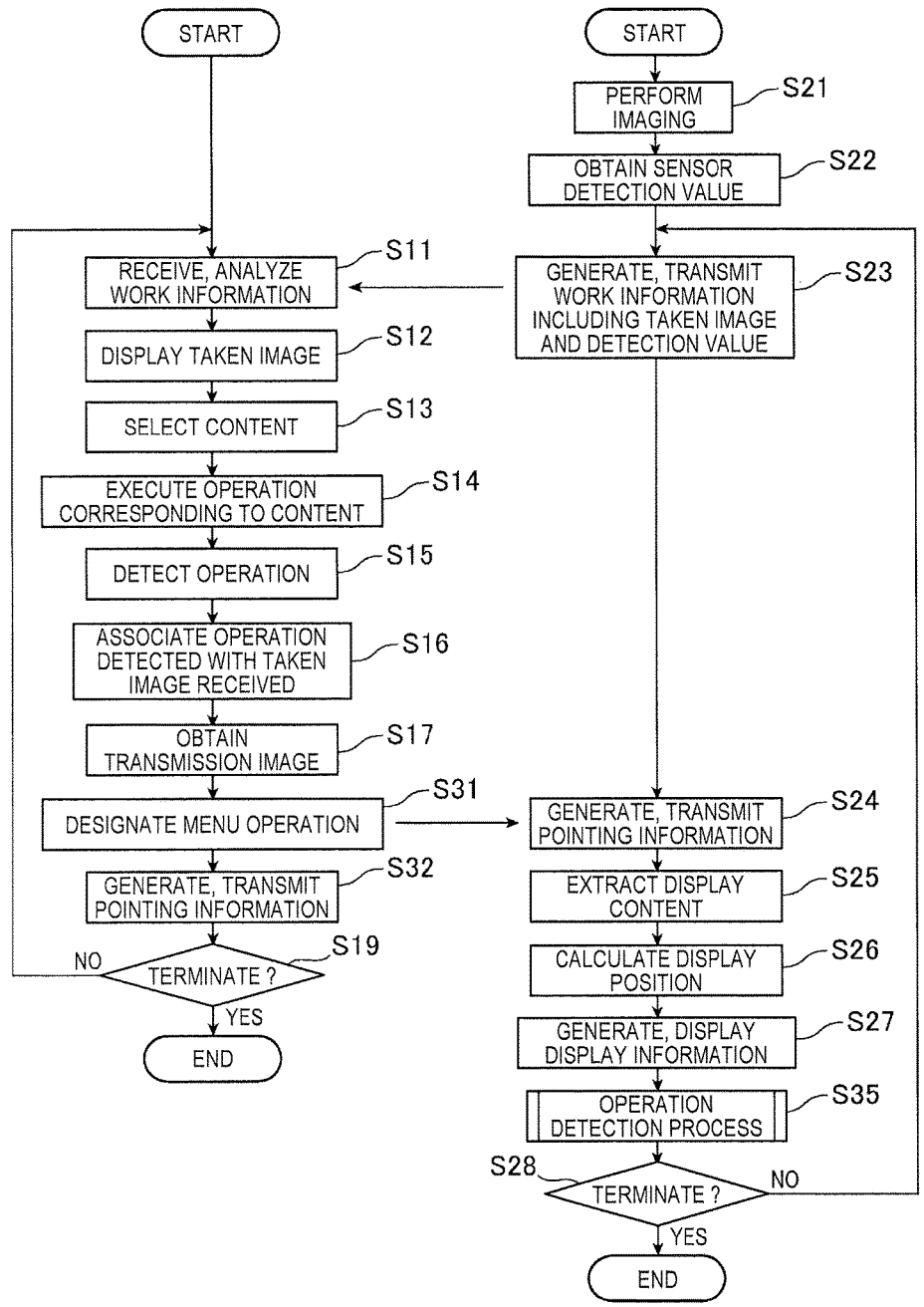
FIGS. 8A and 8B are flowcharts showing an action of a display system according to a second embodiment of the invention.
Figure 9:
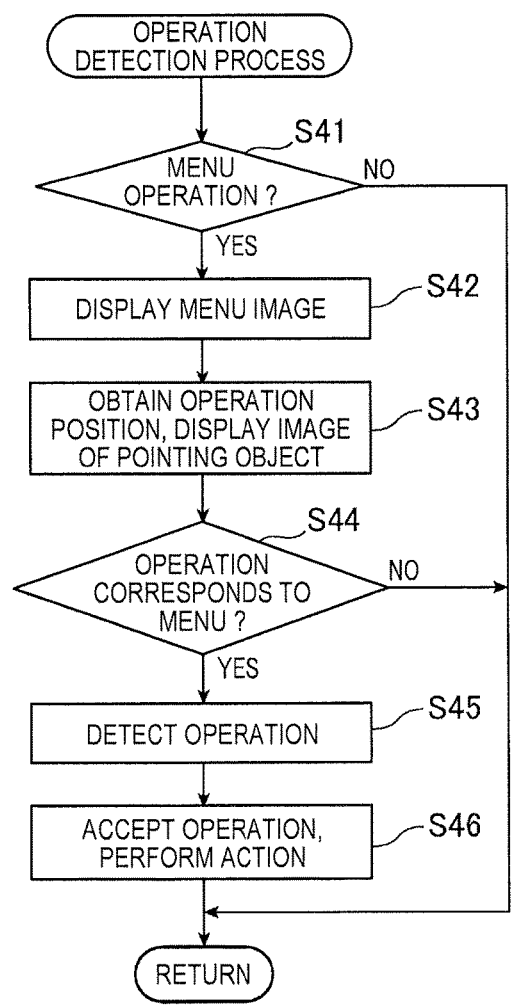
FIG. 9 is a flowchart showing an action of a display system according to the second embodiment.

FIGS. 8A, 8B, and 9 are flowcharts showing an action of the display system 1 according to a second embodiment. FIG. 8A shows an action of the HMD 100A, and FIG. 8B shows an action of the HMD 100B. Further, FIGS. 10A through 10D are diagrams each showing a display example of the HMD 100A, 100B according to the second embodiment.

Since the display system 1 according to the second embodiment is configured similarly to the display system 1 explained in the above description of the first embodiment, graphical description and the explanation of the constituents of the display system 1 will be omitted. Further, in the flowcharts shown in FIGS. 8A, 8B, and 9, the actions common to the first embodiment and the second embodiment and already explained in the description of the first embodiment (FIGS. 6A and 6B) are denoted with the same step numbers.

In the second embodiment, the point that the work information including the taken image taken by the camera 61 of the HMD 100B is transmitted to the HMD 100A, and is displayed in the HMD 100A is substantially the same as in the first embodiment. In the second embodiment, the HMD 100B can be controlled by the position pointing operation performed in the HMD 100A.

In the actions of the HMD 100A shown in FIG. 8A, the steps S11 through S17 are as explained in the above description of the first embodiment.

In the step S17, after the transmission image acquisition section 185 obtains the transmission image, whether or not the menu operation to the HMD 100B is performed is designated by the operation of the operation section 135 (step S31). Then, the pointing information generation section 186 generates the pointing information including the data for designating whether or not the menu operation is performed, and then transmits the pointing information to the HMD 100B (step S32). The pointing information generated in the step S32 includes the image data of the image of the pointing object obtained by the transmission image acquisition section 185, the data representing the operation position and the trajectory of the operation, and the data for making the operation position and the trajectory of the operation correspond to the taken image of the HMD 100B.

In the actions of the HMD 100B shown in FIG. 8B, the steps S21 through S27 are as explained in the above description of the first embodiment.

The HMD 100B receives the pointing information transmitted by the HMD 100A with the communication control section 311, and then generates the display information based on the pointing information to make the image processing section 303 and the display control section 305 display the display information (step S27).

Subsequently, the control section 300 executes the operation detection process (step S35).

FIG. 9 is a flowchart showing the operation detection process executed by the HMD 100B in detail.

In the operation detection process, the operation detection section 323 of the HMD 100B extracts the data designating whether or not the menu operation is performed from the pointing information received in the step S24, and then determines whether or not the menu operation is performed based on the data (step S41). In the case in which it has been determined that the menu operation is not performed (NO in the step S41), the process proceeds to the step S28 shown in FIG. 8B.

In the case in which it has been determined that the menu operation is performed (YES in the step S41), the operation detection section 323 determines the display position of the menu image, and then displays the menu image (step S42). Here, the display position of the menu image can be designated with the data included in the pointing information transmitted by the HMD 100A, or can also be a position set in advance. Further, it is also possible for the operation detection section 323 to automatically determine the position. Subsequently, the operation detection section 323 obtains (step S43) the data representing the operation position from the pointing information, and then determines (step S44) whether or not the operation position thus obtained is the position corresponding to the menu image.

Here, in the case in which it is determined that the operation position is not the position corresponding to the menu image (NO in the step S44), the control section 300 makes the transition to the step S28.

In the case in which the operation position is the position corresponding to the menu image (YES in the step S44), the operation detection section 323 detects the operation to the menu image (step S45). In the step S45, the operation detection section 323 identifies the operating image corresponding to the operation position out of the operating images such as a plurality of icons disposed in the menu image. The control section 300 executes (step S46) the action associated with the operating image identified by the operation detection section 323, and then makes the transition to the step S28 after completing the action.

Figure 10A:
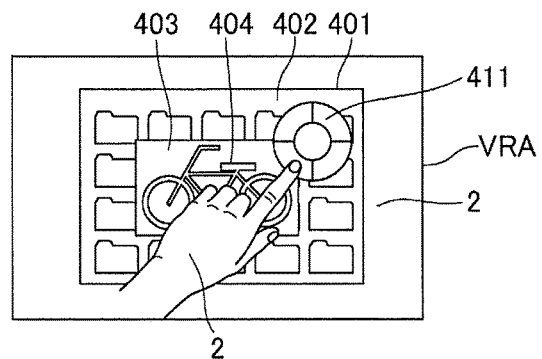
FIGS. 10A through 10D are diagrams each showing a display example of a head mounted display according to the second embodiment.
Figure 10B:
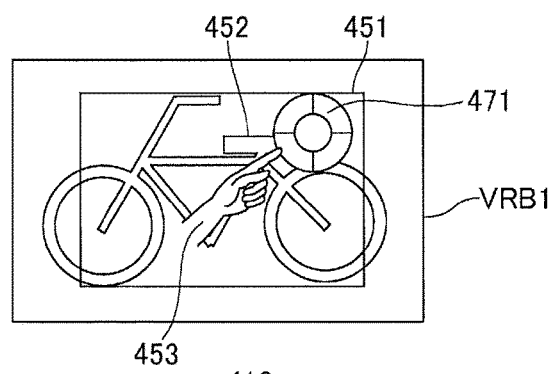
Figure 10C:
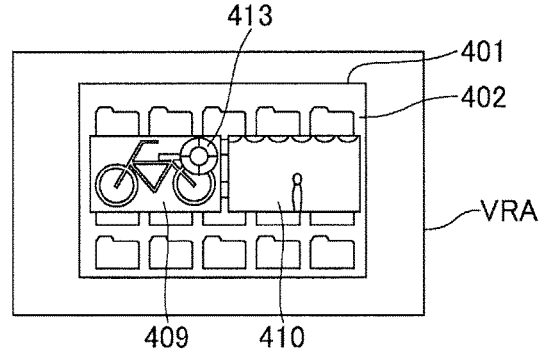
Figure 10D:
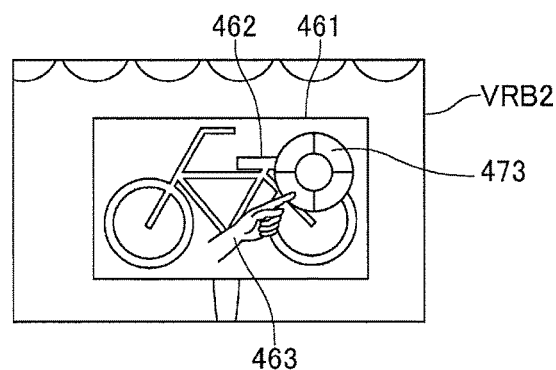

FIG. 10A shows the view field VRA of the commander wearing the HMD 100A, and FIG. 10B shows the view field VRB1 of the worker wearing the HMD 100B. Further FIG. 10C shows another example of the view field VRA of the commander wearing the HMD 100A, and FIG. 10D shows the view field VRB2 of another worker wearing the HMD 100B. It should be noted that FIGS. 10A through 10D each show an example of the view field of the right eye of the commander or the worker, and the view field of the left eye is the same as or bilaterally symmetrical with the respective drawings, and is therefore omitted from the graphical description.

In the view field VRA of the commander shown in FIG. 10A, the normal operation screen 402 is displayed in the display area 401, and the taken image of the HMD 100B is displayed in the display area 403 for displaying the taken image. In the case in which it is designated to perform the menu operation using the operation of the operation section 135, the menu image 411 is displayed in the display area 401. The menu image 411 is not the image for performing the operation to the HMD 100A, but is the image displayed for performing the operation to the HMD 100B. In the menu image 411, there is disposed, for example, a plurality of icons (the operating images) each having a button shape. The icons are associated with the actions performed in the HMD 100B, respectively. As the actions of this kind, there can be cited, for example, display expansion/contraction, drawing start/stop, designation of a figure to be drawn, and designation of a drawing color. The menu image 411 is displayed by the operation period display control section 184 based on the menu image data 123.

When the operation using the pointing object 2 is performed on the menu image 411, the operation detection section 183 detects the operation to identify the operation position. Further, the operation detection section 183 obtains the positions of the menu image 411 during the operation and the operation sections such as the icons included in the menu image 411. In the case in which the operation detection section 183 detects the operation in the state in which the pointing information generation section 186 displays the menu image 411, the pointing information generation section 186 includes the data pointing the menu operation in the pointing information. Further, the pointing information generation section 186 generates pointing information including the operation position of the operation detected by the operation detection section 183, and the positions of the menu image 411 and so on obtained by the operation detection section 183.

Thus, the pointing information including the operation position of the operation performed by the commander in the HMD 100A, the positions of the menu image 411 and so on during the operation, and the data for designating the menu operation is transmitted from the HMD 100A to the HMD 100B. The display position calculation section 321 of the HMD 100B displays the menu image 471 as shown in FIG. 10B in accordance with the positions of the menu image 411 and so on. It should be noted that it is preferable that the positions of the operation sections such as icons provided to the menu image 471 are the same or similar to those of the menu image 411 in the HMD 100A. Therefore, it is also possible to include the data for designating the type or the configuration of the menu image 411 in the pointing information generated and then transmitted by the HMD 100A. The display position calculation section 321 displays the image 453 of the pointing object based on the pointing information. In the case in which the display position of the image 453 of the pointing object overlaps the display positions of the operating sections such as icons of the menu image 471, the pointing detection section 319 detects the operation to the operation section.

Therefore, when the commander performs the position pointing operation with the pointing object 2 in the HMD 100A, the HMD 100B detects the operation in accordance with the position pointing operation, and thus, it is possible to make the HMD 100B perform the action. Therefore, it becomes possible for the commander to remotely operate the HMD 100B.

Further, in the case in which the display system 1 is configured including the plurality of HMD 100B, the HMD 100A receives the work information from the plurality of HMD 100B and then displays the work information.

FIG. 10C shows an example in which the HMD 100A displays the taken images based on the work information received from the two HMD 100B. Among the display areas 409, 410 disposed in the display area 401, in the display area (here, the display area 409) on the target side of the operation using the menu image, there is displayed the menu image 413. When the operation using the pointing object 2 is performed in accordance with the position of the menu image 413, the pointing information including the operation position and the positions of the menu image 413 and so on is transmitted to the HMD 100B corresponding to the display area 409. Further, during the operation to the display area 409, the display based on the work information of another HMD 100B continues in the display area 401.

Further, in the case in which the display system 1 includes a plurality of HMD 100B, it is also possible to transmit the pointing information, which has been transmitted by the HMD 100A to one of the HMD 100B, to another of the HMD 100B. FIG. 10D shows the display example in this case. As shown in FIG. 10D, the content displayed by the HMD 100B in the display area 451 as shown in, for example, FIG. 10B can be displayed in another HMD 100B. The work object is not necessarily included in the outside view of the HMD 100B which displays the display area 461. Therefore, in the display area 461, the image 462 of the work object taken by the HMD 100B is displayed together with the image 463 of the pointing object, and the menu image 473. Further, since the HMD 100B for displaying the display area 461 is not the target of the operation by the HMD 100A, the HMD 100B is not required to perform the action corresponding to the operation of the pointing object 2. Further, it is also possible for the HMD 100B to perform the action corresponding to the pointing object 2 similarly to other HMD 100B. In this case, it is possible for the commander wearing the HMD 100A to operate the plurality of HMD 100B.

As described above, the control section 300 detects the operation to the HMD 100B based on the information representing the operation included in the pointing information received in the communication section 117. More specifically, the control section 300 makes the image display section 20 display the menu image 471 which is an image for the GUI operation. The pointing detection section 319 detects the operation based on the display position of the menu image 471 and the operation position included in the pointing information received by the communication section 117. Therefore, by performing the position pointing operation in the HMD 100A, it is possible to perform the GUI operation to the HMD 100B to control the HMD 100B.

Third Embodiment

Figures 11A, 11B:
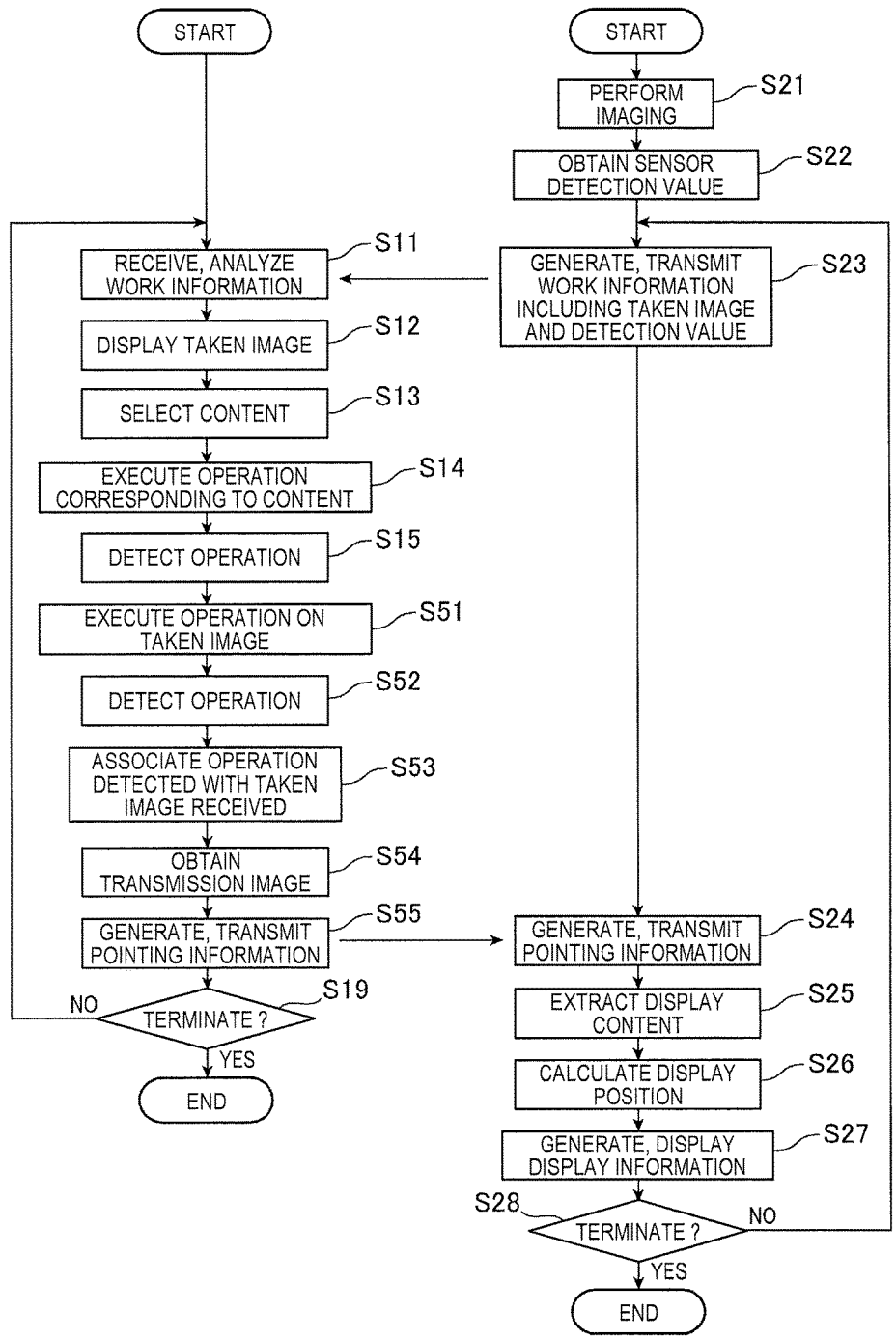
FIGS. 11A and 11B are flowcharts showing an action of a display system according to a third embodiment of the invention.

FIGS. 11A and 11B are flowcharts showing an action of the display system 1 according to a third embodiment. FIG. 11A shows an action of the HMD 100A, and FIG. 11B shows an action of the HMD 100B.

Since the display system 1 according to the third embodiment is configured similarly to the display system 1 explained in the above description of the first embodiment, graphical description and the explanation of the constituents of the display system 1 will be omitted. Further, in the flowcharts shown in FIGS. 11A and 11B, the actions common to the first embodiment and the third embodiment and already explained in the description of the first embodiment (FIGS. 6A and 6B) are denoted with the same step numbers.

In the third embodiment, the point that the work information including the taken image taken by the camera 61 of the HMD 100B is transmitted to the HMD 100A, and is displayed in the HMD 100A is substantially the same as in the first embodiment. In the third embodiment, it is possible to edit the taken image taken by the HMD 100B using the position pointing operation of the HMD 100A, and display the taken image thus edited in the HMD 100B.

In the actions of the HMD 100A shown in FIG. 11A, the steps S11 through S15 are as explained in the above description of the first embodiment. In the display system according to the third embodiment, an operation corresponding to the content is performed in the step S14, and after this operation is detected by the operation detection section 183, an operation to the taken image presently displayed can further be performed (step S51). The operation detection section 183 detects (step S52) the operation to the taken image, and then makes the operation detected in the steps S15 and S52 correspond to the taken image (step S53). Specifically, the operation detection section. 183 generates the data representing the operation position detected in the step S15 as a relative position to the taken image. Further, the operation detection section 183 generates the data of the taken image edited using the operation detected in the step S52.

Subsequently, the transmission image acquisition section 185 obtains (step S54) the transmission image, and the pointing information generation section 186 generates and then transmits (step S55) the pointing information including the image data of the image of the pointing object obtained by the transmission image acquisition section 185, and the data generated by the operation detection section 183. The process of the transmission image acquisition section 185 obtaining the transmission image is a process substantially the same as, for example, the process in the step S17.

Further, the actions of the HMD 100B shown in FIG. 11B are as explained in the above description of the first embodiment. Specifically, the HMD 100B receives (step S24) the pointing information transmitted by the HMD 100A, and then the received information analysis section 317 analyzes the pointing information thus received to extract (step S25) the image data. In the step S25, the taken image data of the HMD 100B edited in the HMD 100A, and the image data of the pointing object are extracted. Subsequently, the display position calculation section 321 calculates (step S26) the position where the image is displayed, and the display information generation section 325 generates the display information to make the image processing section 303 and the display control section 305 display (step S27) the image.

According to the display system 1 related to the third embodiment, in the case in which the work information received from the HMD 100B includes the taken image, the control section 140 makes the image display section 20 display the taken image, and then edits the taken image based on the operation detected by the operation detection section 183 during the period of displaying the taken image. Further, the control section 140 generates the pointing information including the taken image thus edited, and then transmits the result to the HMD 100B. The HMD 100B receives the pointing information including the taken image thus edited, and then display the taken image thus edited using the image display section 20.

Thus, it is possible to show the result, which is obtained by the commander virtually performing the operation to the work object located in the view field of the HMD 100B, to the worker. Therefore, regarding the work to the work object, a larger amount of information can be provided to the worker.

Further, although in the third embodiment, there is explained an example of editing the taken image taken by the HMD 100B using the HMD 100A, it is also possible to, for example, transmit document data or drawing data from the HMD 100B to the HMD 100A, and then edit the document data and the drawing data using the HMD 100A. In this case, the document data and the drawing data thus edited are transmitted to the HMD 100B, and the HMD 100B performs the display based on the document data and the drawing data thus edited. Thus, regarding the work of editing the document, generating and editing the drawing, it is possible for the commander to perform editing to thereby show a so-called example to the worker.

Fourth Embodiment

Figures 12A, 12B:
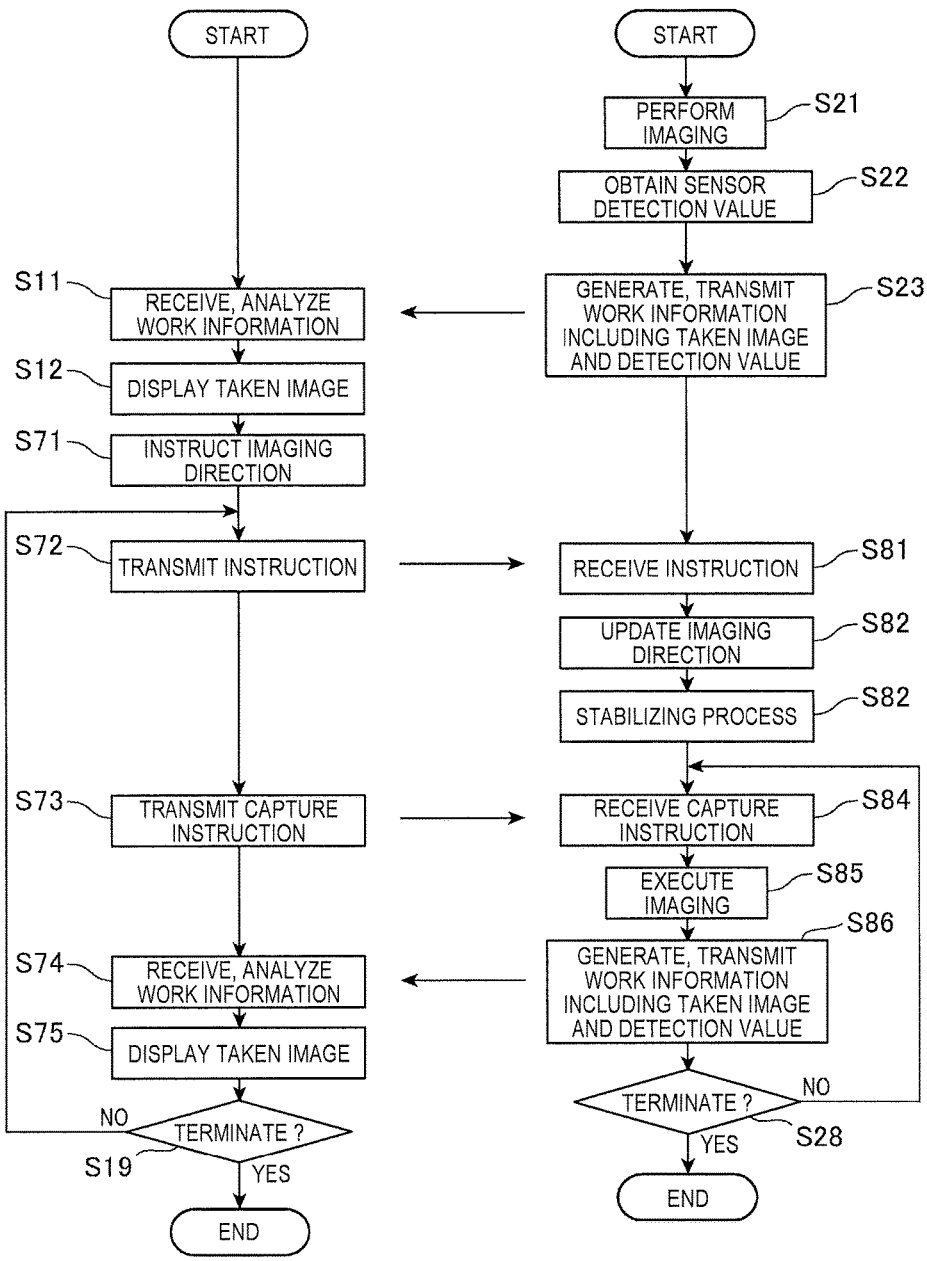
FIGS. 12A and 12B are flowcharts showing an action of a display system according to a fourth embodiment of the invention.

FIGS. 12A and 12B are flowcharts showing an action of the display system 1 according to a fourth embodiment. FIG. 12A shows an action of the HMD 100A, and FIG. 12B shows an action of the HMD 100B.

Since the display system 1 according to the fourth embodiment is configured similarly to the display system 1 explained in the above description of the first embodiment, graphical description and the explanation of the constituents of the display system 1 will be omitted. Further, in the flowcharts shown in FIGS. 12A and 12B, the actions common to the first embodiment and already explained in the description of the first embodiment (FIGS. 6A and 6B) are denoted with the same step numbers.

In the fourth embodiment, it is arranged that the direction to be imaged by the camera 61 of the HMD 100B can be controlled by the HMD 100A. Therefore, in accordance with the instruction of the commander wearing the HMD 100A, the imaging direction of the camera 61 of the HMD 100B can be controlled. If necessary, in order to change and adjust the imaging direction of the camera 61, it is possible to dispose a ball joint or a rotating mechanism capable of changing the direction of the camera 61 in the pedestal of the camera 61, and to provide a manipulator or the like for moving the camera 61. It is sufficient for the manipulator to act under the control of the control section 300, and it is also possible to adopt a configuration in which the imaging control section 313 performs the control.

In the actions of the HMD 100A shown in FIG. 12A, the steps S11 through S12 are as explained in the above description of the first embodiment.

In the display system 1 according to the fourth embodiment, after displaying the taken image in the HMD 100A, the operation of instructing the imaging direction can be made (step S71). The control section 140 of the HMD 100A generates the information of instructing the imaging direction based on the operation detected by the operation detection section 183, and then transmits (step S72) the information using the communication section 117.

In the actions of the HMD 100B shown in FIG. 12B, the steps S21 through S23 are as explained in the above description of the first embodiment.

The HMD 100B receives (step S81) the instruction transmitted by the HMD 100A, and then the operation detection section 183 updates (step S82) the imaging direction of the camera 61 in accordance with the instruction thus received. Subsequently, the operation detection section 183 starts (step S82) a stabilizing process. The stabilizing process is a process of stabilizing the taken image in the case in which it is not easy to stabilize the imaging direction of the camera 61 since the position and the direction of the HMD 100B are changed due to the movement of the worker. Specifically, in the case in which the camera 61 is provided with an optical image stabilization function of shifting the imaging element or the lens, the operation detection section 183 corrects the tremor of the taken image using the image stabilization function of the camera 61. Further, it is also possible for the operation detection section 183 to perform an image processing for correcting the tremor on the taken image data of the camera 61.

In the HMD 100A, the commander can perform an operation of instructing the capture of the taken image of the HMD 100B. Specifically, although it is possible to adopt a configuration of always transmitting the taken image data taken by the HMD 100B from the HMD 100B to the HMD 100A, in order to reduce the power consumption and the amount of data communication, the taken image data is transmitted in accordance with the instruction of the worker in the HMD 100B. In the present embodiment, it is possible for the commander to operate the HMD 100A to instruct the transmission of the image. The control section 140 detects the operation of the commander to generate the instruction for capture, and then transmits (step S73) the instruction to the HMD 100B.

In the HMD 100B, the control section 300 receives (step S84) the instruction of the capture, and then makes the camera 61 perform the imaging (step S85). In the case in which the camera 61 has the configuration of always performing imaging, the control section 300 obtains the taken image data in the step S85. The control section 300 generates the work information including the taken image data thus obtained, and then transmits (step S86) the work information to the HMD 100A. The work information transmitted in the step S86 can be the same information as the information transmitted in the step S23, or the data having a different configuration providing the taken image data is included.

The HMD 100A receives and then analyzes (step S74) the work information transmitted from the HMD 100B, and then displays (step S75) the taken image taken in the HMD 100B using the image display section 20.

According to the display system 1 related to the fourth embodiment, the imaging condition with which the camera 61 of the HMD 100B takes the image is designated by the HMD 100A, and the HMD 100B controls the camera 61 based on the imaging condition thus designated. Therefore, in the case in which the command site A and working site B are distant from each other, it is possible for the commander using the HMD 100A to observe the desired direction and the desired place. The imaging condition includes, for example, the imaging direction of the HMD 100B. The imaging direction can be defined as the direction to which the center axis of the imaging range (field angle) of the camera 61 faces. The taken image data transmitted by the HMD 100B to the HMD 100A is the taken image not following the viewpoint of the worker, and the imaging direction can be controlled by the instruction of the commander. Therefore, it is possible for the commander to obtain the desired information with respect to the working site B as the environment of the HMD 100B, and to efficiently perform the work support, instructions, and so on. Further, since the control of actually changing the imaging direction is performed by the control section 300 of the HMD 100B, an increase in the load of the HMD 100A and an increase in the amount of the communication data can be avoided. Further, since the stabilizing process is performed under the control of the control section 300, the image, which does not follow the motion of the worker, and is stabilized, can be observed in the HMD 100A.

In the fourth embodiment, the HMD 100B is not limited to the case of transmitting the taken image itself of the camera 61, but can also transmit the information generated from the taken image to the HMD 100A. In this case, it is sufficient for the HMD 100A to display the information generated by the HMD 100B based on the taken image, or to output the information as a sound instead of the process of displaying the taken image.

Further, in the fourth embodiment, it is possible to designate the zoom factor as the imaging condition. Specifically, it is possible for the HMD 100A to transmit the instruction of designating the zoom factor in the camera 61 of the HMD 100B in addition to the imaging direction. By controlling the zoom factor, it is possible to adjust not only the magnification in performing imaging in the HMD 100B, but also the imaging range. Further, as the method of designating the imaging direction by the HMD 100A, it is also possible to adopt a method of, for example, designating the imaging direction so that a specific object showing the taken image of the camera 61 of the HMD 100B is fit into the taken image. In this case, it is sufficient for the control section 300 to analyze the taken image data to control the imaging direction and the zoom factor so that the specific object fits into the imaging range.

Further, the information transmitted by the HMD 100A and for designating the imaging condition such as the information transmitted in the step S72 can also be included in the pointing information. In this case, it is possible for the control section 300 to perform the action shown in FIG. 12B in the series of processes for receiving and analyzing the pointing information.

In the fourth embodiment, it is possible to adopt a configuration in which the control section 300 of the HMD 100B clips a part of the imaging range (field angle) of the camera 61 to transmit the part to the HMD 100A. In this case, the control section 300 updates the clipping range of the taken image of the camera 61 in the case of changing the imaging direction under the control of the HMD 100A. For example, if the cameras 61 of the HMD 100B, 100C are each constituted by a wide-angle lens, such an embodiment can easily be realized.

It should be noted that the invention is not limited to the configuration of each of the embodiments described above, but can be implemented in various forms within the scope or the spirit of the invention.

For example, it is possible to adopt an image display section of a different type such as an image display section to be worn like a hat instead of the image display section 20, and it is sufficient to be provided with a display section for displaying an image so as to correspond to the left eye of the user, and a display section for displaying an image so as to correspond to the right eye of the user. Further, it is also possible for the display device according to the invention to adopt a configuration as the head mounted display installed in a mobile object such as a vehicle or a plane. Further, it is also possible to adopt a configuration as the head mounted display incorporated in a body protector such as a helmet. In this case, a part for positioning the device with respect to the body of the user and a part positioned with respect to the part can be used as the mounting sections.

Further, in the above description of the embodiments, the explanation is presented assuming that there is adopted the configuration in which the HMD 100A, 100B each have the image display section 20 and the control device 10A, 10B separated from each other and connected via the connection section 40. The invention is not limited to this configuration, but it is also possible to adopt a configuration in which the control device 10A, 10B and the image display section 20 are integrally configured, and are mounted of the head of the user.

Further, it is sufficient for the HMD 100A, 100B to be a device mounted on the head of the user (the worker, the commander) in at least the image display section 20 for performing the display, and the mounting state of the control device 10A, 10B is not particularly limited. Therefore, a laptop computer, a tablet computer, or a desktop computer can also be used as the control device 10A, 10B. Further, as the control device 10A, 10B, a portable electronic apparatus including a game machine, a cellular phone, a smart phone, and a portable media player, and other dedicated equipment can be used as the control device 10A, 10B. Further, it is also possible to adopt a configuration in which the control device 10A, 10B is configured separately from the image display section 20, and the variety of signals are wirelessly transmitted and received between the control device 10A, 10B and the image display section 20.

Further, for example, as the configuration of generating the image light in the image display section 20, it is also possible to adopt a configuration including an organic EL (organic electroluminescence) display and an organic EL control section. Further, as the configuration of generating the image light, a LCOS (Liquid Crystal On Silicon; LCoS is a registered trademark), a digital micromirror device, and so on can be used.

Further, as the optical system for guiding the image light to the eyes of the user, there can be adopted a configuration in which an optical member for transmitting the outside light entering from the outside toward the device, and the outside light is made to enter the eyes of the user together with the image light. Further, it is also possible to use an optical member located in front of the eyes of the user to overlap a part or the whole of the field of view of the user. Further, it is also possible to adopt a scanning type optical system for causing a scanning movement of the laser beam or the like to form the image light. Further, the invention is not limited to those guiding the image light inside the optical member, but the configuration only provided with a function of guiding the image light by refracting and/or reflecting the image light toward the eyes of the user can also be adopted.

For example, it is also possible to apply the invention to a laser retinal projection head mounted display. Specifically, it is also possible to adopt a configuration in which the light emitting section is provided with a laser source and an optical system for guiding the laser source to the eyes of the user, makes the laser beam enter the eyes of the user, and then scans the surface of the retina with the laser beam to provide an image on the retina to thereby make the user visually recognize the image.

Further, it is also possible to apply the invention to a display device adopting the scanning optical system using an MEMS mirror, and using the MEMS display technology. In other words, as the light emitting section, it is also possible to provide a signal light forming section, a scanning optical system having the MEMS mirror for causing the scanning movement of the light emitted by the signal light forming section, and an optical member on which a virtual image is formed by the light the scanning movement of which is caused by the scanning optical system. In this configuration, the light emitted by the signal light forming section is reflected by the MEMS mirror, enters the optical member, and is guided through the optical member, and then reaches a virtual image forming surface. By the MEMS mirror causing the scanning movement of the light, the virtual image is formed on the virtual image forming surface, and by the user figuring out the virtual image with the eyes, the image is recognized. An optical component used in this case can be a component for guiding the light through a plurality of times of reflection similarly to, for example, the right light guide plate 261 and the left light guide plate 262 in the embodiment described above, or can be realized using a half-mirror surface.

Further, the optical elements according to the invention is not limited to the right light guide plate 261 and left light guide plate 262 respectively including the half mirrors 261A, 262A, but can sufficiently be the optical components for making the image light enter the eyes of the user, and specifically, a diffraction grating, a prism, and a holography display section can also be used.

Further, at least a part of the functional blocks shown in FIGS. 4 and 5 can be realized with hardware, or can be provided with a configuration realized by cooperation between hardware and software, and the invention is not limited to the configuration of arranging the independent hardware resources in the same manner as shown in FIGS. 4 and 5. Further, the programs executed by the control section 140 can also be stored in the storage section 120 or the storage device in the control device 10A, or stored in the ROM provided to the control section 140. The programs executed by the control section 300 can also be stored in the storage section 340 or the storage device in the control device 10B, or stored in the ROM provided to the control section 300. Further, the programs executed by the control section 140 can be stored in a storage device or a storage medium externally connected to the HMD 100A. The programs executed by the control section 300 can similarly be stored in a storage device or a storage medium externally connected to the HMD 100B. Alternatively, it is also possible to install the programs from these storage device and the storage medium into the storage sections 120, 340 and then execute the programs. Further, it is also possible to adopt a configuration of obtaining the programs stored in the external device via the communication section 117 or the interface 114, and then executing the programs. Further, the constituents formed in the control device 10A, 10B can also be formed in the image display section 20 in an overlapping manner. For example, it is also possible to adopt a configuration in which the control section 140 shown in FIG. 4 and the control section 300 shown in FIG. 5 are also disposed in the image display section 20, and in this case, it is possible for the control section in the control device 10A, 10B and the control section of the image display section 20 to share the function.

The entire disclosure of Japanese Patent Application No. 2014-263853, filed Dec. 26, 2014 is expressly incorporated by reference herein.

What is claimed is:

1. A display system comprising: a first display device of a head mounted type, and a second display device of the head mounted type, wherein
the first display device includes:
a first display configured to display an image while allowing an outside view to be visually recognized,
a first camera configured to capture an image of a range including at least a part of the outside view,
a first communication interface configured to:
transmit work information including a captured image to the second display device, and
receive guide information transmitted from the second display device, and
a first processor configured to: cause the first display to display imagery based on the received guide information, and
the second display device includes:
a second display configured to display an image while allowing the outside view to be visually recognized,
a second communication interface configured to:
receive the work information including the captured image transmitted from the first display device, and
transmit generated guide information to the first display device, and
a second processor configured to:
upon receipt of the work information including the captured image received by the second communication interface:
control the second display to display the captured image,
detect a position pointed to by a pointing object,
calculate a pointing position that is a position pointed to by the pointing object relative to the captured image presently displayed by the second display,
generate association information that associates the captured image received by the second communication interface with guide information that includes the detected relative pointing position of the pointing object, and
cause the second communication interface to:
transmit the generated guide information to the first display device.

2. The display system according to claim 1, wherein the first processor is further programmed to:
generate guide target information, and cause the first communication interface to transmit the guide target information with the captured image,
detect a position pointing operation, and
generate the guide information including information adapted to associate a pointing position of the detected position pointing operation with the captured image included in the guide target information.

3. The display system according to claim 2, wherein the second processor is further configured to: generate the guide information so as to include information related to the pointing position of the detected position pointing operation, and an image of a pointing object, and the first processor is further configured to: cause the first display to display the image of the pointing object at a position corresponding to the pointing position included in the guide information received by the first communication interface.

4. The display system according to claim 2, wherein the first processor is further configured to: cause the first display to display an image for a graphical user interface (GUI) operation, and detect an operation based on the display position of the image for the GUI operation and the pointing position included in the guide information received by the second communication interface.

5. The display system according to claim 2, wherein in a case in which the guide target information received by the second communication interface includes the captured image, the second processor causes the second display to display the captured image, edits the captured image based on an operation detected during a period of displaying the captured image, and generates the guide information including the captured image as edited.

6. The display system according to claim 1, wherein the first processor is further configured to: detect an operation to the first display device based on information representing an operation included in the guide information received by the first communication interface.

7. The display system according to claim 1, wherein the second display device transmits information adapted to designate an imaging condition using the second communication interface, and the first processor is further configured to: receive the imaging condition from the second display device, control based on the imaging condition received, and transmit guide target information generated based on the captured image to the second display device.

8. The display system according to claim 7, wherein the second display device transmits information adapted to designate one of an imaging direction, a zoom factor, and the imaging direction and the zoom factor as the imaging condition using the second communication interface, and the first processor is further configured to: control one of the imaging direction, the zoom factor, and the imaging direction and the zoom factor based on the imaging condition received from the second display device.

9. The display system according to claim 1, wherein the first processor is configured to: recognize the outside scenery to determine a work object, and cause the first display to display an image of the pointing object at the relative pointing position of the pointing object relative to the work object.

10. The display system according to claim 1, wherein the second processor is further configured to: cause a menu image to be displayed for performing an operation to the first display device.

11. A head mounted display device comprising:
a display configured to display an image while allowing an outside view to be visually recognized;
a camera configured to capture an image of a range including at least a part of the outside view;
a communication interface configured to:
transmit work information including a captured image to a second display device, and
receive guide information transmitted from the second display device, and
a processor configured to: cause the display to display imagery based on the received guide information, wherein the second device is configured to: upon receipt of the work information including the captured image by the second display device: control the second display device to display the captured image, detect a position pointed to by a pointing object, calculate a pointing position that is a position pointed to by the pointing object relative to the captured image presently displayed by the second display device, generate association information that associates the captured image with guide information that includes the detected relative pointing position of the pointing object, and transmit the generated guide information to the first display device.

12. An information display method comprising:
cause a display of a first display device to display imagery while allowing an outside view to be visually recognized;
transmitting, by the first display device, work information including an image captured by a camera of the first display device to a second display device;
receiving, by the first display device, guide information transmitted from the second display device; and
causing, by the first display device, a display of the first display device to display imagery based on the received guide information, wherein the second display device is configured to: upon receipt of the work information including the captured image by the second display device: control the second display device to display the captured image, detect a position pointed to by a pointing object, calculate a pointing position that is a position pointed to by the pointing object relative to the captured image presently displayed by the second display device, generate association information that associates the captured image with guide information that includes the detected relative pointing position of the pointing object, and transmit the generated guide information to the first display device.

13. A non-transitory computer readable medium comprising computer program instructions that, when executed by a processor, cause the processor to:
cause a display of a first head mounted display device to display imagery while allowing an outside view to be visually recognized;
transmit work information including an image captured by a camera of the first display device to a second display device;
receive guide information transmitted from the second display device; and
cause a display of the first display device to display imagery based on the received guide information, wherein the second display device is configured to: upon receipt of the work information including the captured image by the second display device: control the second display device to display the captured image, detect a position pointed to by a pointing object, calculate a pointing position that is a position pointed to by the pointing object relative to the captured image presently displayed by the second display device, generate association information that associates the captured image with guide information that includes the detected relative pointing position of the pointing object, and transmit the generated guide information to the first display device.

* * * * *